US012803835B2

(12) United States Patent
Lu et al.

(10) Patent No.: US 12,803,835 B2
(45) Date of Patent: Nov. 17, 2026

(54) COMMUNICATION METHOD, APPARATUS, AND SYSTEM

(71) Applicant: Huawei Technologies Co., Ltd., Shenzhen (CN)

(72) Inventors: Yanzhao Lu, Dongguan (CN); Jilong Han, Wuhan (CN); Gengchen Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 18/593,297

(22) Filed: Mar. 1, 2024

(65) Prior Publication Data

US 2024/0205040 A1 Jun. 20, 2024

Related U.S. Application Data

(63) Continuation of application No. PCT/CN2022/114861, filed on Aug. 25, 2022.

(30) Foreign Application Priority Data

Sep. 3, 2021 (CN) ......................... 202111034304.6

(51) Int. Cl.
*H04J 3/00* (2006.01)
*H04B 1/10* (2006.01)
(Continued)

(52) U.S. Cl.
CPC ..... *H04L 12/1881* (2013.01); *H04W 72/0446* (2013.01); *H04W 72/30* (2023.01)

(58) Field of Classification Search
CPC . H04W 72/04; H04W 52/0216; H04W 74/04; H04W 72/0446; H04W 72/30;
(Continued)

(56) References Cited

U.S. PATENT DOCUMENTS 7,366,520 B2 * 4/2008 Haustein .............. H04B 7/0854 455/450
9,331,727 B2 * 5/2016 Luo ...................... H04B 1/1027
(Continued)

FOREIGN PATENT DOCUMENTS

EP 0831612 B1 * 6/2009 ........ H04W 52/0216
JP H05114883 A 5/1993

*Primary Examiner* — Edan Orgad
*Assistant Examiner* — Vanneilian Lalchinthang
(74) *Attorney, Agent, or Firm* — Slater Matsil, LLP

(57) ABSTRACT

This application discloses a communication method, apparatus, and system, and belongs to the field of communication technologies. The method includes: After obtaining a first digital signal sent by a transmitting end, a first receiving end performs digital signal processing on a first sub-signal in the first digital signal. A communication system in which the first receiving end is located includes the transmitting end and a plurality of receiving ends, the transmitting end is communicatively connected to the plurality of receiving ends, and the first receiving end is any one of the plurality of receiving ends. The first sub-signal is determined based on a receiving slot corresponding to the first receiving end, and different receiving ends in the plurality of receiving ends correspond to different receiving slots.

20 Claims, 12 Drawing Sheets

(51) Int. Cl.

| | |
|---|---|
| ***H04L 12/18*** | (2006.01) |
| ***H04L 12/24*** | (2006.01) |
| ***H04W 72/0446*** | (2023.01) |
| ***H04W 72/12*** | (2023.01) |
| ***H04W 72/30*** | (2023.01) |

(58) Field of Classification Search

CPC ........... H04W 72/1284; H04L 12/1881; H04L 27/3455; H04L 5/0003; H04L 5/14; H04L 5/0005; H04J 3/00; H04B 10/27; H04B 1/126; H04B 1/1027; H04B 1/123; H04B 1/525; H04B 17/345; Y02D 30/70

USPC .......................................................... 370/312

See application file for complete search history.

(56) References Cited

U.S. PATENT DOCUMENTS

| | | | | |
|---|---|---|---|---|
| 9,799,335 | B2 * | 10/2017 | Lv | G10L 25/51 |
| 11,977,180 | B2 * | 5/2024 | Itkin | G01S 7/4021 |
| 2002/0044543 | A1 | 4/2002 | Okajima et al. | |
| 2003/0095538 | A1 * | 5/2003 | Kayama | H04L 47/788 370/503 |
| 2006/0206341 | A1 * | 9/2006 | Lokhoff | G10L 19/0204 704/E19.018 |
| 2014/0226619 | A1 * | 8/2014 | Kuwahara | H04L 5/0005 370/330 |
| 2019/0296974 | A1 * | 9/2019 | Barzegar | H04B 10/40 |

* cited by examiner

COMMUNICATION METHOD, APPARATUS, AND SYSTEM

CROSS-REFERENCE TO RELATED APPLICATIONS

This application is a continuation of International Application No. PCT/CN2022/114861, filed on Aug. 25, 2022, which claims priority to Chinese Patent Application No. 202111034304.6, filed on Sep. 3, 2021. The disclosures of the aforementioned applications are hereby incorporated by reference in their entireties.

TECHNICAL FIELD

This application relates to the field of communication technologies, and in particular, to a communication method, apparatus, and system.

BACKGROUND

In a communication system, point-to-multipoint (P2MP, or referred to as PTMP) communication may be performed between a transmitting end and receiving ends. For example, the transmitting end may be communicatively connected to a plurality of receiving ends, and the transmitting end may communicate with the plurality of receiving ends.

Currently, the transmitting end is connected to the plurality of receiving ends through an optical splitter. The transmitting end generates a digital signal corresponding to each receiving end based on data that needs to be sent to each of the plurality of receiving ends, uses a carrier to carry the digital signal in a time division multiplexing (TDM) manner, and sends the carrier to each receiving end. After receiving the carrier, each receiving end obtains all digital signals carried on the carrier, and performs digital signal processing on the digital signals, to obtain data that needs to be sent by the transmitting end to the receiving end.

However, in a process in which the transmitting end performs point-to-multipoint communication with the plurality of receiving ends, power consumption of the receiving end is high.

SUMMARY

This application provides a communication method, apparatus, and system, to resolve a problem of high power consumption of a receiving end. The technical solutions are as follows:

According to a first aspect, a communication method is provided. The method includes: After obtaining a first digital signal sent by a transmitting end, a first receiving end performs digital signal processing on a first sub-signal in the first digital signal. A communication system in which the first receiving end is located includes the transmitting end and a plurality of receiving ends, the transmitting end is communicatively connected to the plurality of receiving ends, and the first receiving end is any one of the plurality of receiving ends. The first sub-signal is determined based on a receiving slot corresponding to the first receiving end, and different receiving ends in the plurality of receiving ends correspond to different receiving slots.

It can be learned that the first receiving end needs to perform digital signal processing only on the first sub-signal in the first digital signal, so that the first receiving end needs to process a small quantity of digital signals, to reduce power consumption of the first receiving end. In addition, the first sub-signal is determined based on the receiving slot corresponding to the first receiving end. Therefore, after processing the first sub-signal, the first receiving end does not obtain data sent by the transmitting end to another receiving end, to ensure security of communication between the transmitting end and the another receiving end.

Optionally, the first receiving end further prohibits digital signal processing on a sub-signal other than the first sub-signal in the first digital signal. Because the first receiving end prohibits digital signal processing on another sub-signal, the first receiving end needs to process a small quantity of digital signals, to reduce power consumption of the first receiving end. In addition, the first receiving end does not obtain data sent by the transmitting end to another receiving end, to ensure security of communication between the transmitting end and the another receiving end.

Optionally, the first receiving end may determine the receiving slot corresponding to the first receiving end based on a second digital signal sent by the transmitting end. In this case, before performing digital signal processing on the first sub-signal in the first digital signal, the first receiving end further needs to obtain the second digital signal sent by the transmitting end, and determine the receiving slot corresponding to the first receiving end based on information that is carried in the second digital signal and that is about the receiving slot corresponding to the first receiving end. The second digital signal carries the information about the receiving slot corresponding to the first receiving end. When the first receiving end determines the receiving slot corresponding to the first receiving end based on the second digital signal sent by the transmitting end, a receiving slot corresponding to each receiving end is set by the transmitting end. In this case, the transmitting end may flexibly set a corresponding receiving slot for each receiving end according to a requirement. Certainly, the first receiving end may also determine the receiving slot corresponding to the first receiving end in another manner. For example, the receiving slot is preconfigured on the transmitting end and the first receiving end, and the first receiving end may obtain the preconfigured receiving slot.

The first digital signal and the second digital signal may be carried on a same carrier, or may be carried on different carriers. When the first digital signal and the second digital signal are carried on a same carrier, the first receiving end may further receive a carrier sent by the transmitting end. The carrier carries the first digital signal and the second digital signal. Then, when obtaining the first digital signal sent by the transmitting end, the first receiving end may obtain the first digital signal carried on the carrier; and when obtaining the second digital signal sent by the transmitting end, the first receiving end may obtain the second digital signal carried on the carrier. When the first digital signal and the second digital signal are carried on a same carrier, the transmitting end may simultaneously send the first digital signal and the second digital signal to the first receiving end by using the same carrier, to improve communication efficiency. In addition, when the first digital signal and the second digital signal are carried on different carriers, a carrier that carries the second digital signal may be transmitted before carriers that carry digital signals carried in the plurality of receiving slots.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. Further, to help the first receiving end identify the slot frame, the frame header of the slot frame may include a type identifier of the slot frame, and the type identifier of the slot frame is different from a type identifier of another frame.

Optionally, the information about the receiving slot corresponding to the first receiving end includes first information of the receiving slot corresponding to the first receiving end, and the first information includes a start time point and a length of a slot, or a start time point and an end time point of a slot. In one aspect, if the first information includes a start time point and a length of a slot, the first receiving end may determine that a time period that starts from the start time point of the slot and lasts for the length is the receiving slot corresponding to the first receiving end. In this case, a start time point of the receiving slot is the start time point in the first information, and a length of the receiving slot is the length in the first information. In another aspect, if the first information includes a start time point and an end time point of a slot, the first receiving end may determine a time period from the start time point to the end time point as the receiving slot corresponding to the first receiving end. In this case, a start time point of the receiving slot is the start time point in the first information, and an end time point of the receiving slot is the end time point in the first information.

Optionally, the information about the receiving slot corresponding to the first receiving end may further include an identifier of the first receiving end. In this case, the first receiving end may determine, based on the identifier of the first receiving end, the information about the receiving slot corresponding to the first receiving end in information carried in the second digital signal.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. In this case, the information about the receiving slot corresponding to the first receiving end includes the first information of the receiving slot corresponding to the first receiving end, and the information about the time deviation of the first receiving end relative to the transmitting end. The first information includes a start time point and a length of a slot, or a start time point and an end time point of a slot.

When determining the receiving slot corresponding to the first receiving end based on the information that is carried in the second digital signal and that is about the receiving slot corresponding to the first receiving end, the first receiving end may first determine an initial slot based on the first information, and then correct the initial slot based on the information about the time deviation, to obtain the receiving slot corresponding to the first receiving end. When the first information includes a start time point and a length of a slot, a start time point of the initial slot is the start time point in the first information, and a length of the initial slot is the length in the first information. When the first information includes a start time point and an end time point of a slot, a start time point of the initial slot is the start time point in the first information, and an end time point of the initial slot is the end time point in the first information. When the information about the receiving slot corresponding to the first receiving end includes the information about the time deviation, the first receiving end can correct the initial slot based on the information, to obtain an accurate receiving slot corresponding to the first receiving end.

Optionally, after obtaining the first digital signal and the second digital signal, the first receiving end may further perform time recovery on the two digital signals. If the first digital signal and the second digital signal are carried on a same carrier, for each digital signal in the first digital signal and the second digital signal, the first receiving end may perform time recovery on each digital signal by using the first digital signal, the second digital signal, or all digital signals carried on the carrier. It should be noted that the first digital signal and the second digital signal are carried on a same carrier, and channel impact on the two digital signals is basically the same as channel impact on an initial digital signal. Therefore, time recovery can be performed by using the initial digital signal, the first digital signal, or the second digital signal.

According to a second aspect, a communication method is provided. The method includes: After obtaining information about a receiving slot corresponding to a first receiving end, a transmitting end sends a first digital signal and a second digital signal to the first receiving end. The communication system in which the transmitting end is located further includes a plurality of receiving ends, the transmitting end is communicatively connected to the plurality of receiving ends, and the first receiving end is any one of the plurality of receiving ends. The second digital signal carries the information about the receiving slot corresponding to the first receiving end, and the second digital signal indicates the first receiving end to perform digital signal processing on a first sub-signal in the first digital signal. The first sub-signal is carried in the receiving slot corresponding to the first receiving end, and the plurality of receiving ends correspond to different receiving slots.

Because the second digital signal indicates the first receiving end to perform digital signal processing on the first sub-signal in the first digital signal, the first receiving end needs to perform digital signal processing only on the first sub-signal in the first digital signal, so that the first receiving end needs to process a small quantity of digital signals, to reduce power consumption of the first receiving end. In addition, after processing the first sub-signal, the first receiving end does not obtain data sent by the transmitting end to another receiving end, to ensure security of communication between the transmitting end and the another receiving end.

Optionally, the first digital signal and the second digital signal may be carried on a same carrier, or may be carried on different carriers. When the first digital signal and the second digital signal are carried on a same carrier, when sending the first digital signal and the second digital signal to the first receiving end, the transmitting end may send the carrier to the first receiving end. The carrier carries the first digital signal and the second digital signal.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. Further, to help the first receiving end identify the slot frame, the frame header of the slot frame may include a type identifier of the slot frame, and the type identifier of the slot frame is different from a type identifier of another frame.

Optionally, the information about the receiving slot corresponding to the first receiving end includes first information of the receiving slot corresponding to the first receiving end, and the first information includes a start time point and a length of a slot, or a start time point and an end time point of a slot. In one aspect, if the first information includes a start time point and a length of a slot, the receiving slot corresponding to the first receiving end is a time period that starts from the start time point of the slot and lasts for the length. In this case, a start time point of the receiving slot is the start time point in the first information, and a length of the receiving slot is the length in the first information. In another aspect, if the first information includes a start time point and an end time point of a slot, the receiving slot corresponding to the first receiving end is a time period from the start time point to the end time point. In this case, a start time point of the receiving slot is the start time point in the first information, and an end time point of the receiving slot is the end time point in the first information.

Optionally, the information about the receiving slot corresponding to the first receiving end may further include an identifier of the first receiving end. In this case, the first receiving end may determine, based on the identifier of the first receiving end, the information about the receiving slot corresponding to the first receiving end in information carried in the second digital signal.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. In this case, the information about the receiving slot corresponding to the first receiving end includes the first information of the receiving slot corresponding to the first receiving end, and the information about the time deviation of the first receiving end relative to the transmitting end. The first information includes a start time point and a length of a slot, or a start time point and an end time point of a slot.

According to a third aspect, a communication apparatus is provided. The communication apparatus is a first receiving end in a communication system, the communication system includes a transmitting end and a plurality of receiving ends, the transmitting end is communicatively connected to the plurality of receiving ends, and the first receiving end is any one of the plurality of receiving ends. The communication apparatus includes a first obtaining module and a processing module. The first obtaining module is configured to obtain a first digital signal sent by the transmitting end. The processing module is configured to perform digital signal processing on a first sub-signal in the first digital signal. The first sub-signal is determined based on a receiving slot corresponding to the first receiving end, and different receiving ends in the plurality of receiving ends correspond to different receiving slots.

The processing module in the first receiving end needs to perform digital signal processing only on the first sub-signal that is in the first digital signal and that is determined based on the receiving slot corresponding to the first receiving end, so that the first receiving end needs to process a small quantity of digital signals, to reduce power consumption of the first receiving end. In addition, after processing the first sub-signal, the processing module does not obtain data sent by the transmitting end to another receiving end, to ensure security of communication between the transmitting end and the another receiving end.

Optionally, the communication apparatus further includes: a prohibition module, configured to prohibit digital signal processing on a sub-signal other than the first sub-signal in the first digital signal. Because the prohibition module prohibits digital signal processing on another sub-signal, the first receiving end needs to process a small quantity of digital signals, to reduce power consumption of the first receiving end. In addition, the first receiving end does not obtain data sent by the transmitting end to another receiving end, to ensure security of communication between the transmitting end and the another receiving end.

Optionally, the first receiving end may determine the receiving slot corresponding to the first receiving end based on a second digital signal sent by the transmitting end. In this case, the communication apparatus further includes a second obtaining module and a determining module. The second obtaining module is configured to obtain the second digital signal sent by the transmitting end. The second digital signal carries the information about the receiving slot corresponding to the first receiving end. The determining module is configured to determine the receiving slot corresponding to the first receiving end based on the information that is carried in the second digital signal and that is about the receiving slot corresponding to the first receiving end. When the first receiving end determines the receiving slot corresponding to the first receiving end based on the second digital signal sent by the transmitting end, a receiving slot corresponding to each receiving end is determined by the transmitting end. In this case, the transmitting end may flexibly set a corresponding receiving slot for each receiving end according to a requirement. Certainly, the first receiving end may also determine the receiving slot corresponding to the first receiving end in another manner. For example, the receiving slot is preconfigured on the transmitting end and the first receiving end.

The first digital signal and the second digital signal may be carried on a same carrier, or may be carried on different carriers. When the first digital signal and the second digital signal are carried on a same carrier, the communication apparatus further includes a receiving module. The receiving module is configured to receive a carrier sent by the transmitting end. The carrier carries the first digital signal and the second digital signal. In this case, the first obtaining module is configured to obtain the first digital signal carried on the carrier, and the second obtaining module is configured to obtain the second digital signal carried on the carrier. When the first digital signal and the second digital signal are carried on a same carrier, the transmitting end may simultaneously send the first digital signal and the second digital signal to the first receiving end by using the same carrier, to improve communication efficiency. In addition, when the first digital signal and the second digital signal are carried on different carriers, a carrier that carries the second digital signal may be transmitted before carriers that carry digital signals carried in the plurality of receiving slots.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. Further, to help the first receiving end identify the slot frame, the frame header of the slot frame may include a type identifier of the slot frame, and the type identifier of the slot frame is different from a type identifier of another frame.

Optionally, the information about the receiving slot corresponding to the first receiving end includes first information of the receiving slot corresponding to the first receiving end, and the first information includes a start time point and a length of a slot, or a start time point and an end time point of a slot. In one aspect, if the first information includes a start time point and a length of a slot, the first receiving end may determine that a time period that starts from the start time point of the slot and lasts for the length is the receiving slot corresponding to the first receiving end. In this case, a start time point of the receiving slot is the start time point in the first information, and a length of the receiving slot is the length in the first information. In another aspect, if the first information includes a start time point and an end time point of a slot, the first receiving end may determine a time period from the start time point to the end time point as the receiving slot corresponding to the first receiving end. In this case, a start time point of the receiving slot is the start time point in the first information, and an end time point of the receiving slot is the end time point in the first information.

Optionally, the information about the receiving slot corresponding to the first receiving end may further include an identifier of the first receiving end. In this case, the first receiving end may determine, based on the identifier of the first receiving end, the information about the receiving slot corresponding to the first receiving end in information carried in the second digital signal.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. In this case, the information about the receiving slot corresponding to the first receiving end includes the first information of the receiving slot corresponding to the first receiving end, and the information about the time deviation of the first receiving end relative to the transmitting end. The first information includes a start time point and a length of a slot, or a start time point and an end time point of a slot.

When determining the receiving slot corresponding to the first receiving end based on the information that is carried in the second digital signal and that is about the receiving slot corresponding to the first receiving end, the determining module may first determine an initial slot based on the first information, and then correct the initial slot based on the information about the time deviation, to obtain the receiving slot corresponding to the first receiving end. When the first information includes a start time point and a length of a slot, a start time point of the initial slot is the start time point in the first information, and a length of the initial slot is the length in the first information. When the first information includes a start time point and an end time point of a slot, a start time point of the initial slot is the start time point in the first information, and an end time point of the initial slot is the end time point in the first information. When the information about the receiving slot corresponding to the first receiving end includes the information about the time deviation, the first receiving end can correct the initial slot based on the information, to obtain an accurate receiving slot corresponding to the first receiving end.

Optionally, after obtaining the first digital signal and the second digital signal, the first receiving end may further perform time recovery on the two digital signals. Correspondingly, the communication apparatus further includes a time recovery module. If the first digital signal and the second digital signal are carried on a same carrier, for each digital signal in the first digital signal and the second digital signal, the time recovery module may perform time recovery on each digital signal by using the first digital signal, the second digital signal, or the foregoing initial digital signal. It should be noted that the first digital signal and the second digital signal are carried on a same carrier, and channel impact on the two digital signals is basically the same as channel impact on the initial digital signal. Therefore, time recovery can be performed by using the initial digital signal, the first digital signal, or the second digital signal.

According to a fourth aspect, a communication apparatus is provided. The communication apparatus is a transmitting end in a communication system, the communication system further includes a plurality of receiving ends, and the transmitting end is communicatively connected to the plurality of receiving ends. The communication apparatus includes an obtaining module and a sending module. The obtaining module is configured to obtain information about a receiving slot corresponding to a first receiving end. The first receiving end is any one of the plurality of receiving ends. The sending module is configured to send a first digital signal and a second digital signal to the first receiving end. The second digital signal carries the information about the receiving slot corresponding to the first receiving end, the second digital signal indicates the first receiving end to perform digital signal processing on a first sub-signal in the first digital signal, the first sub-signal is carried in the receiving slot corresponding to the first receiving end, and the plurality of receiving ends correspond to different receiving slots.

Optionally, the first digital signal and the second digital signal may be carried on a same carrier, or may be carried on different carriers. When the first digital signal and the second digital signal are carried on a same carrier, the sending module is configured to send a carrier to the first receiving end. The carrier carries the first digital signal and the second digital signal.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. Further, to help the first receiving end identify the slot frame, the frame header of the slot frame may include a type identifier of the slot frame, and the type identifier of the slot frame is different from a type identifier of another frame.

Optionally, the information about the receiving slot corresponding to the first receiving end includes first information of the receiving slot corresponding to the first receiving end, and the first information includes a start time point and a length of a slot, or a start time point and an end time point of a slot. In one aspect, if the first information includes a start time point and a length of a slot, the receiving slot corresponding to the first receiving end is a time period that starts from the start time point of the slot and lasts for the length. In this case, a start time point of the receiving slot is the start time point in the first information, and a length of the receiving slot is the length in the first information. In another aspect, if the first information includes a start time point and an end time point of a slot, the receiving slot corresponding to the first receiving end is a time period from the start time point to the end time point. In this case, a start time point of the receiving slot is the start time point in the first information, and an end time point of the receiving slot is the end time point in the first information.

Optionally, the information about the receiving slot corresponding to the first receiving end may further include an identifier of the first receiving end. In this case, the first receiving end may determine, based on the identifier of the first receiving end, the information about the receiving slot corresponding to the first receiving end in information carried in the second digital signal.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. In this case, the information about the receiving slot corresponding to the first receiving end includes the first information of the receiving slot corresponding to the first receiving end, and the information about the time deviation of the first receiving end relative to the transmitting end. The first information includes a start time point and a length of a slot, or a start time point and an end time point of a slot.

According to a fifth aspect, a communication system is provided. The communication system includes a transmitting end and a plurality of receiving ends, and the transmitting end is communicatively connected to the plurality of receiving ends. The receiving end includes the communication apparatus according to any design of the third aspect, and the transmitting end includes the communication apparatus according to any design of the fourth aspect.

According to a sixth aspect, a chip is provided. The chip includes a programmable logic circuit and/or program instructions. When running, the chip is configured to implement the communication method according to any design of the first aspect, or when running, the chip is configured to implement the communication method according to any design of the second aspect.

For the technical effects brought by any one of the designs in the second aspect to the sixth aspect, refer to the technical effects brought by a corresponding design in the first aspect. Details are not described herein again.

DETAILED DESCRIPTION OF ILLUSTRATIVE EMBODIMENTS

To make principles and technical solutions of this application clearer, the following further describes implementations of this application in detail with reference to the accompanying drawings.

Figure 1:
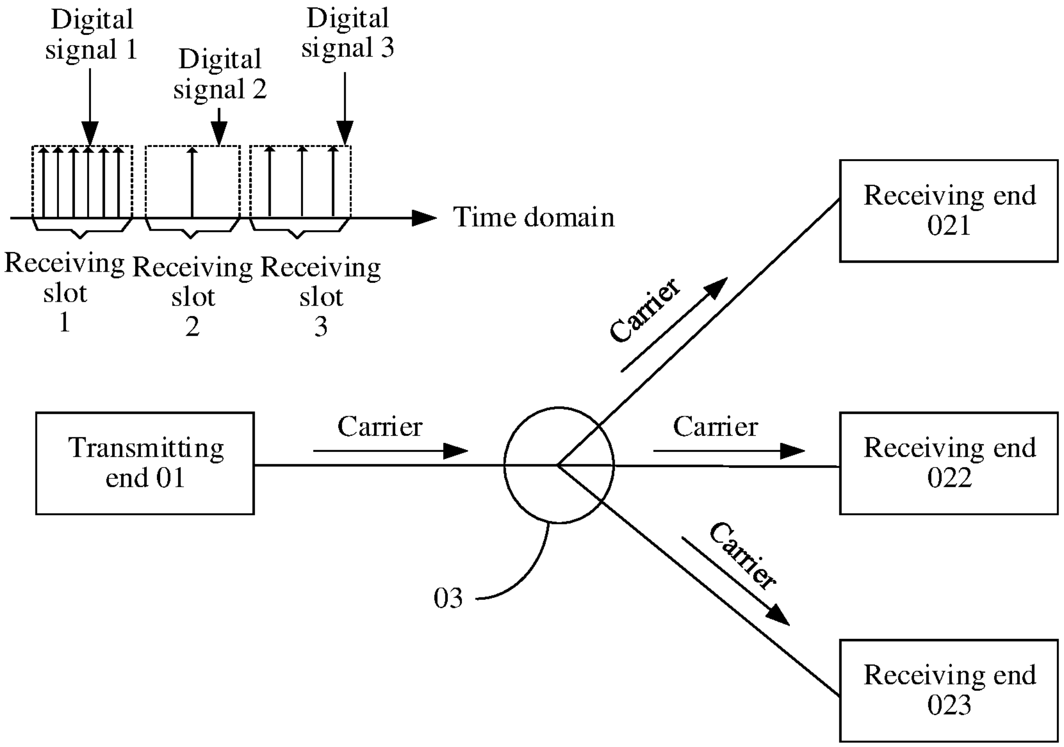
FIG. 1 is a schematic diagram of a structure of a communication system according to an embodiment of this application.

FIG. 1 is a schematic diagram of a structure of a communication system according to an embodiment of this application. As shown in FIG. 1, the communication system includes a transmitting end 01 and a plurality of receiving ends (for example, receiving ends 021, 022, and 023 in FIG. 1). The transmitting end is communicatively connected to each receiving end, for example, through an optical fiber (not shown in FIG. 1). It should be noted that a quantity of receiving ends in the communication system may be any quantity greater than or equal to 2. In FIG. 1, an example in which the communication system includes three receiving ends is used.

The communication system shown in FIG. 1 may be any communication system, such as an intensity modulation and direct detection (IM&DD) system, a coherent optical communication system, a passive optical network (PON) system, or an internet of things system. This is not limited in embodiments of this application. Application scenarios of the communication system are various, for example, a passive optical local area network (POL) scenario, an in-vehicle optical network scenario, and an industrial optical network scenario. A transmitting end and a receiving end in the POL scenario are located in a same campus, both a transmitting end and a receiving end in the in-vehicle optical network scenario are disposed on a vehicle, and both a transmitting end and a receiving end in the industrial optical network scenario are located in an industrial manufacturing workshop.

In the communication system provided in embodiments of this application, the transmitting end may be any apparatus that can send a signal, and the receiving end may be any apparatus that can receive a signal. For example, when the communication system is a PON system, the transmitting end may be an optical line terminal (OLT), the receiving end may be an optical network terminal (ONT), and the ONT is also referred to as an optical network unit (ONU).

Figure 2:
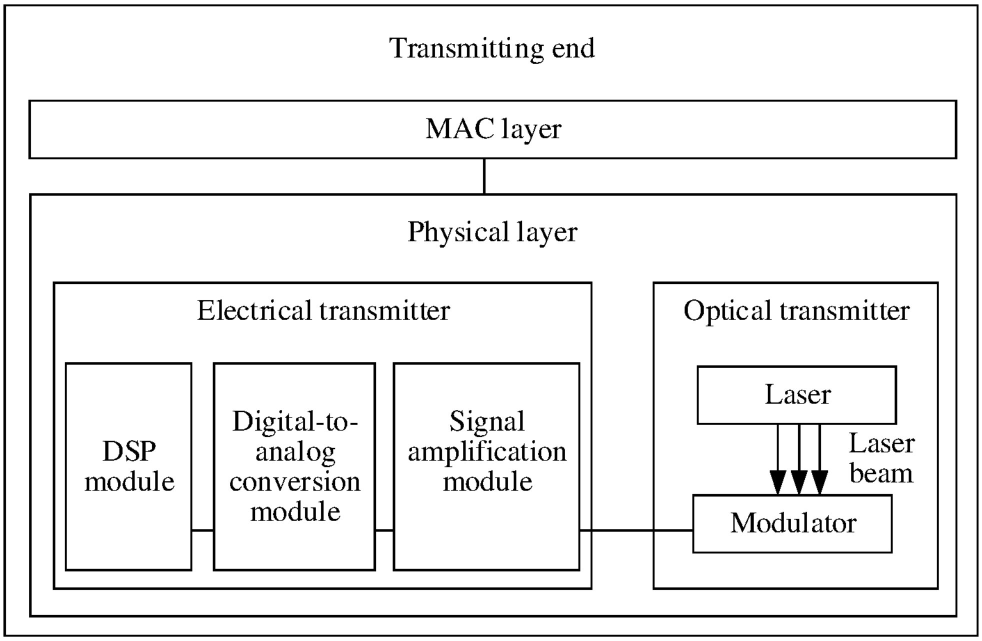
FIG. 2 is a schematic diagram of a structure of a transmitting end according to an embodiment of this application.

FIG. 2 is a schematic diagram of a structure of a transmitting end according to an embodiment of this application. Refer to FIG. 2. The transmitting end may include a media access control (MAC) layer and a physical layer that are connected, and the physical layer includes an electrical transmitter and an optical transmitter. The electrical transmitter includes a digital signal processing (DSP) module, a digital-to-analog conversion module, and a signal amplification module. The signal amplification module in this embodiment of this application may be any amplification module, for example, a burst mode trans-impedance amplifier (BM-TIA) module. The optical transmitter includes a laser, a modulator, and the like. The MAC layer is configured to generate data that needs to be transmitted. The DSP module is configured to generate a digital signal based on the data that needs to be transmitted. The digital-to-analog conversion module is configured to convert the digital signal into an analog signal. The signal amplification module is configured to amplify the analog signal. The laser is configured to emit a laser beam. The modulator is configured to: modulate, based on the amplified analog signal, the laser beam emitted by the laser into a carrier (the carrier is also referred to as an optical signal, for example, a coherent optical signal or a non-coherent optical signal), and send the carrier to a receiving end.

Figure 3:
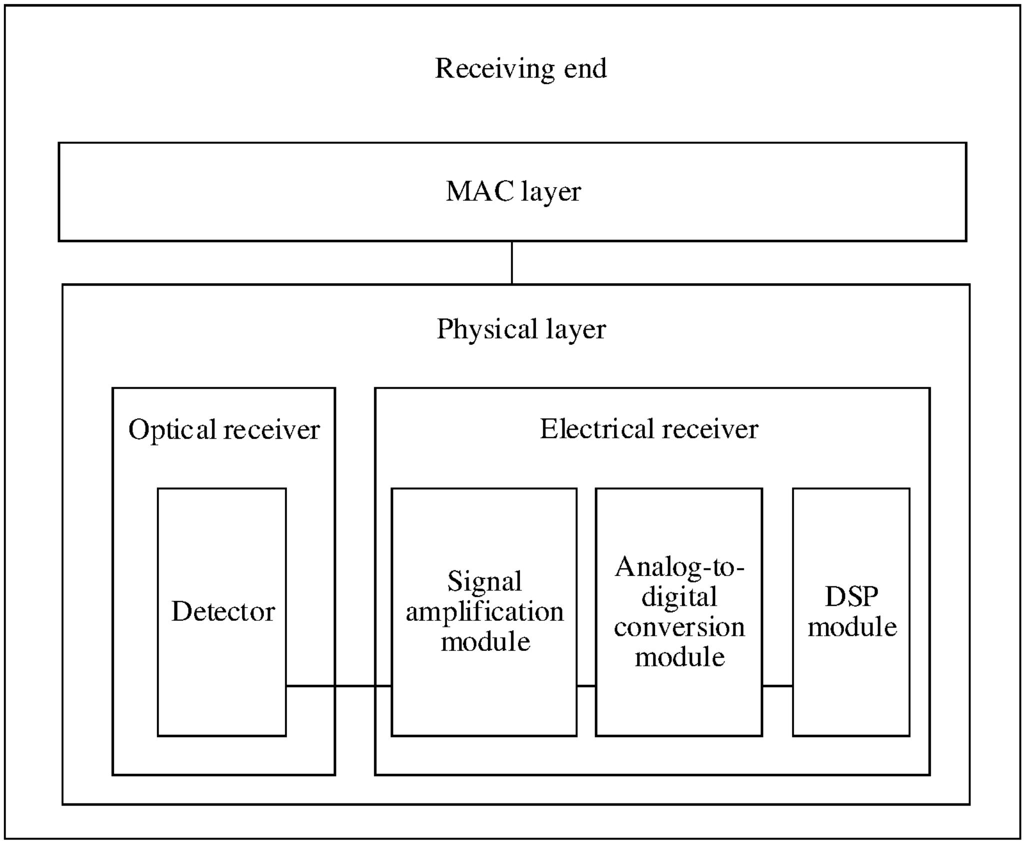
FIG. 3 is a schematic diagram of a structure of a receiving end according to an embodiment of this application.

FIG. 3 is a schematic diagram of a structure of a receiving end according to an embodiment of this application. Refer to FIG. 3. The receiving end includes a MAC layer and a physical layer that are connected, and the physical layer includes an optical receiver and an electrical receiver. The optical receiver includes a detector and the like, and the electrical receiver includes a signal amplification module, an analog-to-digital conversion module, and a DSP module. The detector is configured to: receive a carrier on an optical fiber, and convert the carrier into an analog signal. The signal amplification module is configured to amplify the analog signal. The analog-to-digital conversion module is configured to convert the amplified analog signal into a digital signal. The DSP module is configured to: perform digital signal processing on the digital signal, obtain data that needs to be transmitted by a transmitting end, and send the data to the MAC layer.

In this application, the receiving end may also send a signal to the transmitting end. In this case, the receiving end may also include the structure shown in FIG. 2, and the transmitting end may also include the structure shown in FIG. 3. This is not limited in embodiments of this application.

Figure 4:
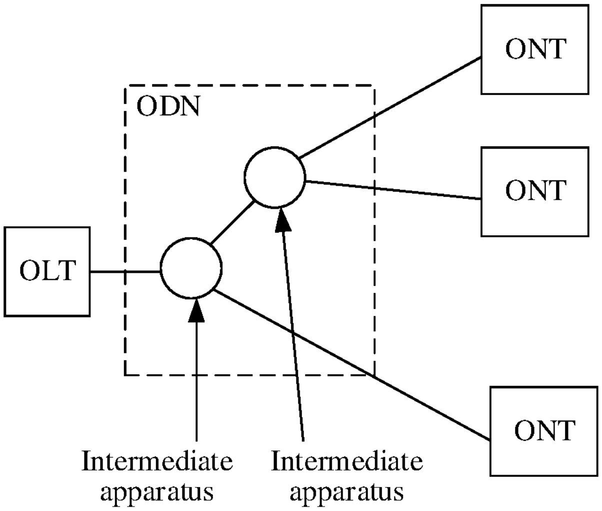
FIG. 4 is a schematic diagram of P2MP communication according to an embodiment of this application.

Further, the communication system may include an intermediate apparatus located between the transmitting end and the receiving end. For example, still refer to FIG. 1. The communication system further includes an optical splitter 03 (an intermediate apparatus), the optical splitter 03 is also referred to as a coupler (coupler), and the optical splitter 03 is located between the transmitting end 01 and the plurality of receiving ends. For another example, as shown in FIG. 4, when the transmitting end is an OLT and the receiving end is an ONT, the communication system further includes an optical splitter (an intermediate apparatus, which is not shown in FIG. 4) and an optical distribution network (ODN). The optical splitter is located between the OLT and the ODN, and the ODN includes at least one intermediate apparatus.

When the transmitting end is communicatively connected to the plurality of receiving ends, the transmitting end may perform P2MP communication with the plurality of receiving ends.

The transmitting end generates a digital signal corresponding to each receiving end based on data that needs to be sent to each of the plurality of receiving ends, uses a carrier to carry the digital signals in a time division multiplexing manner, and sends the carrier to each receiving end. The digital signal corresponding to each receiving end carries the data that needs to be sent by the transmitting end to the receiving end. For example, still refer to FIG. 1. The carrier carries digital signals 1, 2, and 3, the digital signal 1 is carried in a receiving slot 1, the digital signal 2 is carried in a receiving slot 2, and the digital signal 3 is carried in a receiving slot 3. Signals in the three receiving slots are sequentially arranged in time domain. The digital signal 1 corresponds to the receiving end 021, and the digital signal 1 carries data that needs to be sent by the transmitting end to the receiving end 021. The digital signal 2 corresponds to the receiving end 022, and the digital signal 2 carries data that needs to be sent by the transmitting end to the receiving end 022. The digital signal 3 corresponds to the receiving end 023, and the digital signal 3 carries data that needs to be sent by the transmitting end to the receiving end 023.

Transmission rates of digital signals corresponding to the receiving ends may be the same or may be different. This is not limited in embodiments of this application. For example, in FIG. 1, a rate of the digital signal 1 corresponding to the receiving end 021 is 10 gigabits per second (Gbps), a rate of the digital signal 2 corresponding to the receiving end 022 is 2.5 Gbps, and a rate of the digital signal 3 corresponding to the receiving end 023 is 1.25 Gbps.

After receiving the carrier, each receiving end converts the carrier into an analog signal by using a detector, amplifies the analog signal by using a signal amplification module, converts, by using an analog-to-digital conversion module, the amplified analog signal into a digital signal carried on the carrier, and performs digital signal processing on the digital signal by using a DSP module, to obtain data that needs to be sent by the transmitting end to the plurality of receiving ends. Processing of the detector, processing of the signal amplification module, processing of the analog-to-digital conversion module, and processing of the DSP module all belong to processing at a physical layer. After the processing at the physical layer is performed on the carrier, the receiving end can obtain data that needs to be sent by the transmitting end to the plurality of receiving ends. Then, the receiving end needs to use a MAC layer to screen, from the data, data that is sent by the transmitting end to the receiving end.

However, in a process in which the transmitting end performs point-to-multipoint communication with the plurality of receiving ends, power consumption caused by digital signal processing performed by the receiving end on a digital signal is large, and a lot of processing resources (such as a DSP module) of the receiving end are wasted. In addition, in the communication process, after performing processing of the physical layer on a digital signal, each receiving end not only obtains data that needs to be sent by the transmitting end to the receiving end, but also obtains data that needs to be sent by the transmitting end to another receiving end. This causes leakage of the data that needs to be sent by the transmitting end to the another receiving end, and affects communication security.

An embodiment of this application provides a communication method. In the communication method, in a process in which the transmitting end performs point-to-multipoint communication with the plurality of receiving ends, a receiving end performs digital signal processing only on a part (for example, a subsequent first sub-signal) of a digital signal sent by the transmitting end. In this way, the receiving end does not need to demodulate all the digital signal, to reduce power consumption of the receiving end and reduce a waste of processing resources of the receiving end. In addition, the part of the digital signal is determined based on a receiving slot corresponding to the receiving end. Therefore, the receiving end does not demodulate a digital signal carried in a receiving slot corresponding to another receiving end, and each receiving end is isolated at a physical layer, so that each receiving end does not obtain data that needs to be sent by the transmitting end to the another receiving end, to ensure communication security.

Figure 5:
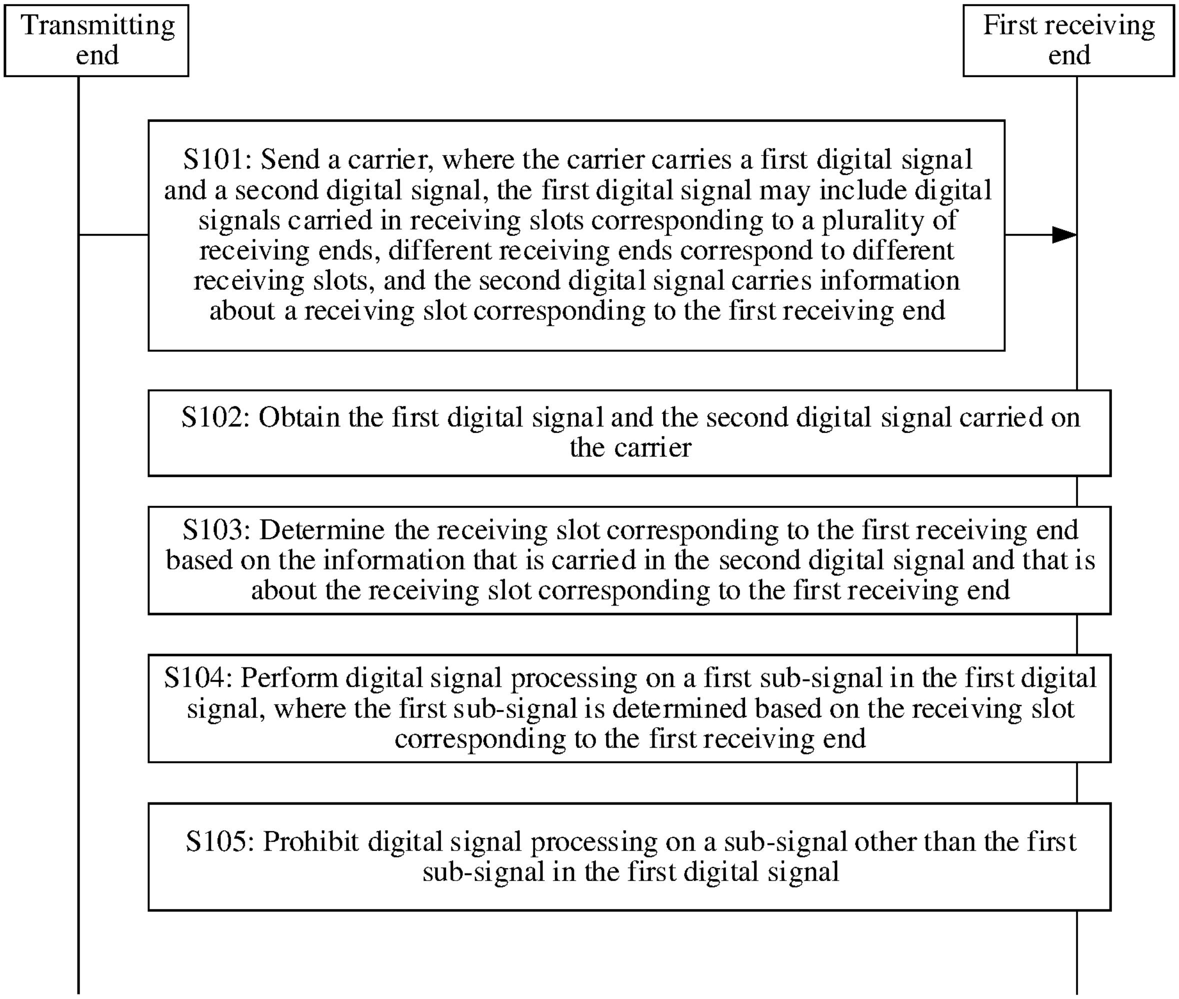
FIG. 5 is a flowchart of a communication method according to an embodiment of this application.

For example, FIG. 5 is a flowchart of a communication method according to an embodiment of this application. As shown in FIG. 5, the communication method may be performed by a transmitting end and a first receiving end in a communication system, and the first receiving end is any one of a plurality of receiving ends that are communicatively connected to the transmitting end. Refer to FIG. 5. The communication method may include the following steps.

S101: The transmitting end sends a carrier to the first receiving end, where the carrier carries a first digital signal and a second digital signal. The first digital signal may include digital signals carried in receiving slots corresponding to the plurality of receiving ends, and different receiving ends correspond to different receiving slots. The second digital signal carries information about a receiving slot corresponding to the first receiving end.

Figure 6:
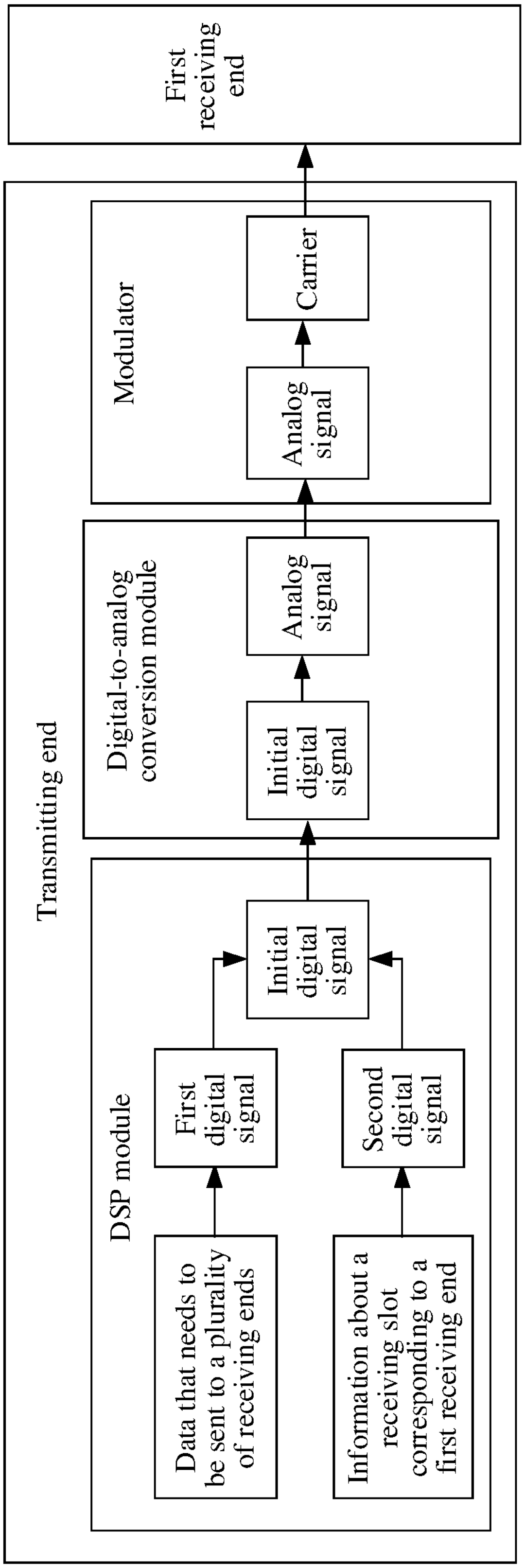
FIG. 6 is a schematic diagram of signal processing at a transmitting end according to an embodiment of this application.

Refer to FIG. 6. In S101, the transmitting end may first obtain data that needs to be sent to the plurality of receiving ends and the information about the receiving slot corresponding to the first receiving end. Then, the transmitting end may generate the first digital signal based on the data that needs to be sent to the plurality of receiving ends, and generate, based on the information about the receiving slot corresponding to the first receiving end, the second digital signal that carries the information. Finally, the transmitting end may combine the first digital signal and the second digital signal to obtain an initial digital signal, and send, to the first receiving end, the carrier that carries the initial digital signal.

The first digital signal includes the digital signals carried in the receiving slots corresponding to the plurality of receiving ends, and different receiving ends correspond to different receiving slots. A digital signal carried in a receiving slot corresponding to each receiving end may be referred to as a sub-signal. In this case, the first digital signal includes a plurality of sub-signals.

The first digital signal and the second digital signal may be combined in a time division multiplexing manner, or the first digital signal and the second digital signal may be combined in a frequency division multiplexing manner, or the first digital signal and the second digital signal may be combined in a time division multiplexing plus frequency division multiplexing manner. This is not limited in this embodiment of this application.

When using the carrier to carry the initial digital signal, the transmitting end may convert the initial digital signal into an analog signal, and then load the analog signal on the carrier.

Still refer to FIG. 6. In the foregoing process, a DSP module in the transmitting end may obtain the data sent to the plurality of receiving ends, obtain the information about the receiving slot corresponding to the first receiving end, generate the first digital signal, generate the second digital signal, and combine the first digital signal and the second digital signal to obtain the initial digital signal. A digital-to-analog conversion module in the transmitting end may convert the initial digital signal into the analog signal. A modulator in the transmitting end may load the analog signal on the carrier. Optionally, before loading the analog signal on the carrier, the transmitting end may further amplify the analog signal. This process may be performed by a signal amplification module in the transmitting end.

The second digital signal may use any coding scheme, for example, a low-order coding scheme such as a non-return zero (NRZ) coding scheme. A low-order coding scheme has a low requirement on a channel, so that the first receiving end can highly sensitively extract information carried in the second digital signal. The second digital signal may also use another coding scheme, for example, a return to zero (RZ) coding scheme or a non-return zero inverted (NRZI) coding scheme.

A data amount carried in the second digital signal may be less than a data amount carried in a digital signal carried in the receiving slot corresponding to the receiving end. Therefore, a transmission rate of the second digital signal may be less than a transmission rate of the digital signal carried in the receiving slot corresponding to the receiving end.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. In addition, to help the first receiving end identify the slot frame, the frame header of the slot frame may include a type identifier of the slot frame, and the type identifier of the slot frame is different from a type identifier of another frame.

Further, the information that is carried in the second digital signal and that is about the receiving slot corresponding to the first receiving end can indicate the receiving slot. For example, the information about the receiving slot corresponding to the first receiving end may include first information of the receiving slot corresponding to the first receiving end. The first information includes a start time point and a length of a slot, or a start time point and an end time point of a slot. Assuming that the first information includes a start time point x of a slot and a length a of the slot, it indicates that the receiving slot corresponding to the first receiving end is a time period that starts from the start time point x and lasts for the length a.

Optionally, the information about the receiving slot corresponding to the first receiving end may further include an identifier of the first receiving end, for example, an identity document (identity document, ID) of the first receiving end.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. When the information about the receiving slot corresponding to the first receiving end includes the information about the time deviation, the receiving slot corresponding to the first receiving end should be a slot obtained by correcting, based on the information about the time deviation, a slot determined based on the first information. Assuming that the first information includes a start time point x of the slot and a length a of the slot, and the information about the time deviation is a time deviation of 1 second, it indicates that the receiving slot corresponding to the first receiving end is a time period after a time period that starts from the start time point x and lasts for the length a is delayed by 1 second.

It should be noted that, in this embodiment of this application, an example in which the second digital signal carries the information about the receiving slot corresponding to the first receiving end is used. Certainly, the second digital signal may also carry information about a receiving slot corresponding to each receiving end.

Further, because the transmitting end is communicatively connected to the plurality of receiving ends, the transmitting end may communicate with the plurality of receiving ends in a time division multiplexing manner. For example, each of the plurality of receiving ends has a corresponding receiving slot, and different receiving ends correspond to different receiving slots. For each receiving end, a digital signal that needs to be sent to the receiving end is carried in a receiving slot corresponding to the receiving end. That is, a digital signal that needs to be sent by the transmitting end to the receiving end is transmitted in the receiving slot. Three receiving slots shown in FIG. 1 are used as an example. A receiving end 021 corresponds to a receiving slot 1, a receiving end 022 corresponds to a receiving slot 2, and a receiving end 023 corresponds to a receiving slot 3. In S101, the carrier sent by the transmitting end to the first receiving end may carry a digital signal 1 carried in the receiving slot 1, a digital signal 2 carried in the receiving slot 2, a digital signal 3 carried in the receiving slot 3, and the second digital signal.

The carrier in S101 may be a single carrier, or may be a plurality of subcarriers (for example, dual carriers including two subcarriers). A modulation scheme of the single carrier may be a binary on-off keying (OOK) modulation scheme, four-level pulse amplitude modulation (PAM4), or the like. A modulation scheme of the plurality of subcarriers may be an orthogonal frequency division multiplexing (OFDM) modulation scheme. In the OFDM modulation scheme, hundreds or thousands of subcarriers may be orthogonal to each other, subcarrier modulation is flexible and variable, and optimal modulation efficiency may be designed based on channel parameters (for example, a channel response, a frequency domain response, and a signal-to-noise ratio). For example, the transmitting end may use a water filling method to modulate different subcarriers by using modulation formats with different spectral efficiency based on a frequency domain response or a signal-to-noise ratio of a channel, to improve a transmission effect of each subcarrier.

Figure 7:
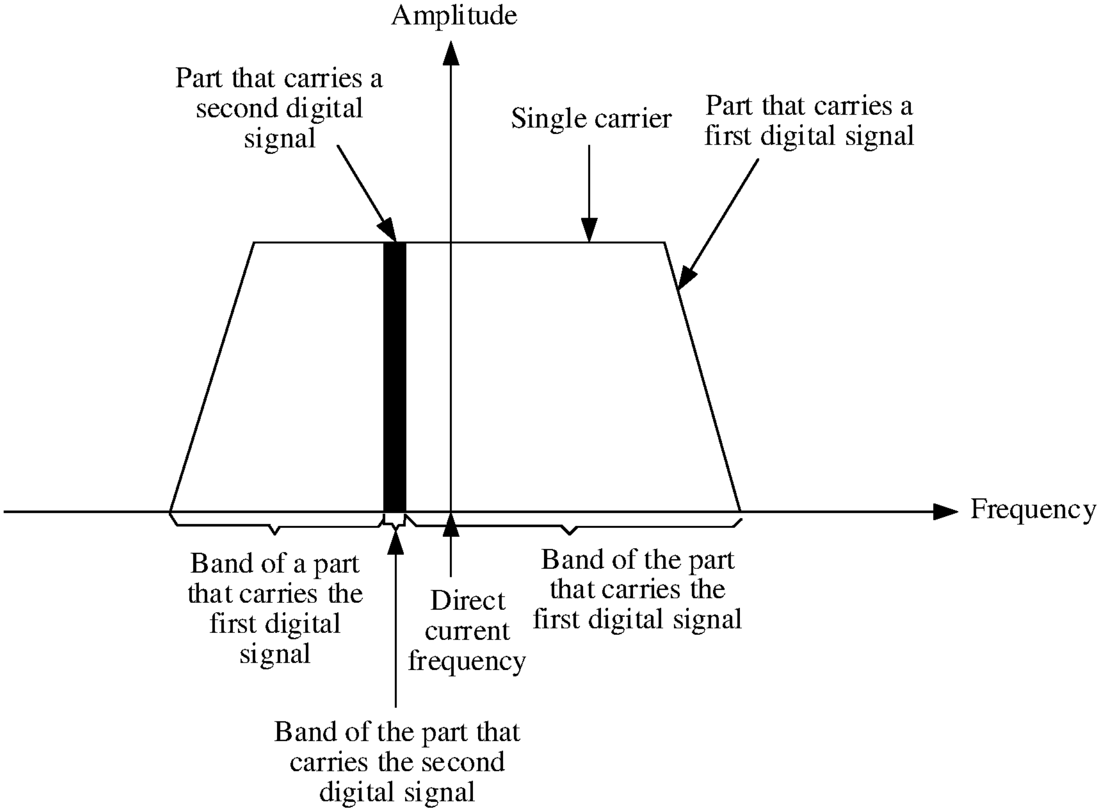
FIG. 7 is a spectrum diagram of a carrier according to an embodiment of this application.
Figure 8:
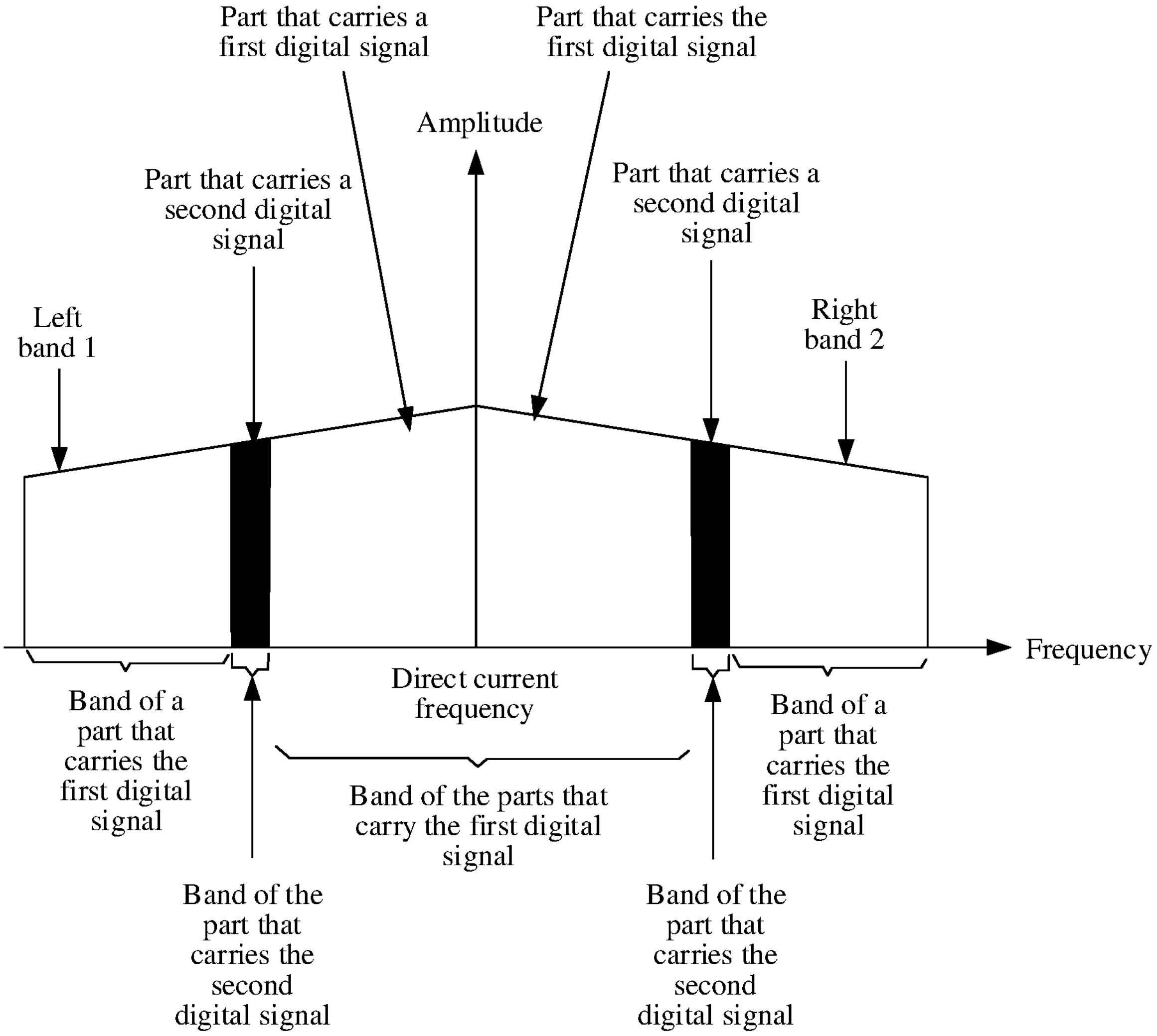
FIG. 8 is a spectrum diagram of another carrier according to an embodiment of this application.
Figure 9:
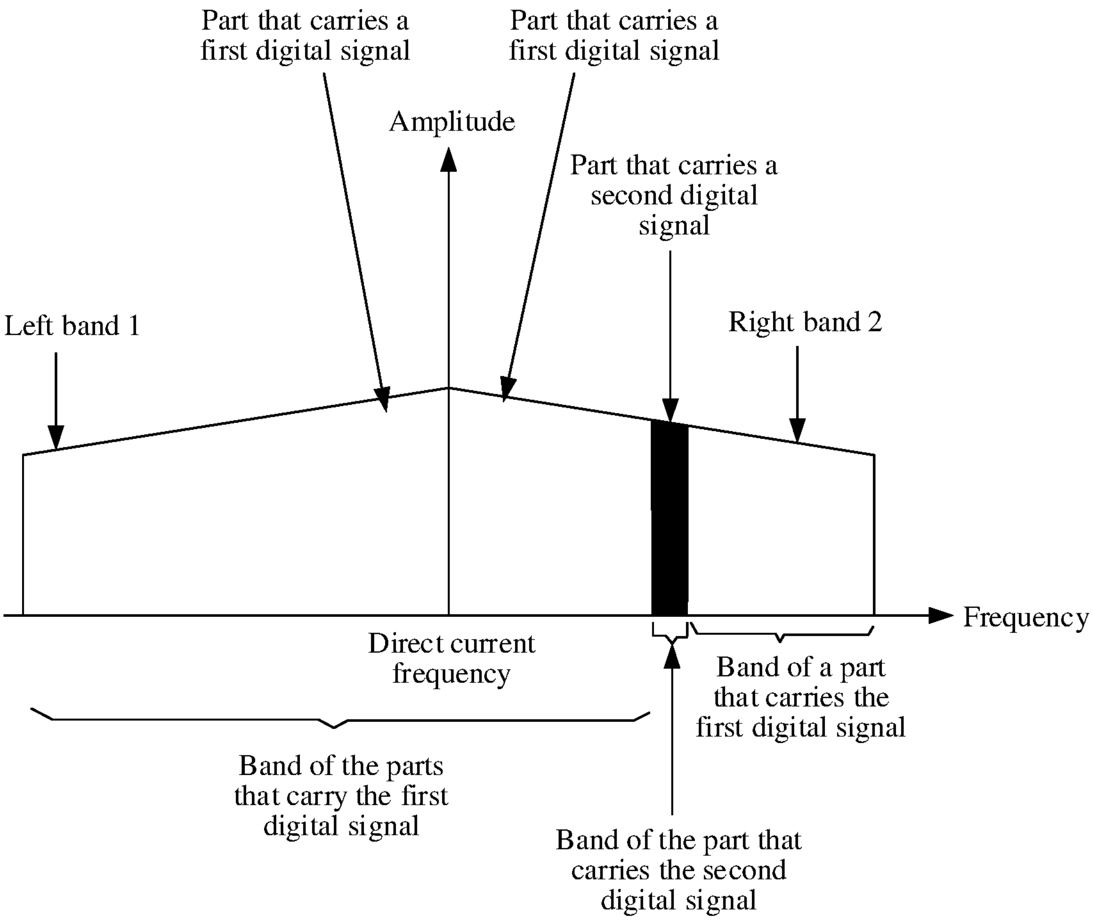
FIG. 9 is a spectrum diagram of another carrier according to an embodiment of this application.

In addition, a band of a part that carries the second digital signal in the carrier may be any band in the carrier, for example, a low-frequency band close to a direct current frequency, an intermediate-frequency band, or an edge band. For example, as shown in FIG. 7, when the carrier in S101 is a single carrier, a band of a part that carries the second digital signal in the single carrier may be a low-frequency band close to a direct current frequency in FIG. 7. For another example, as shown in FIG. 8, when the carrier in S101 is a plurality of subcarriers, a spectrum graph of the plurality of subcarriers includes a left band 1 and a right band 2 that are symmetric. The left band 1 and the right band 2 each carry a second digital signal, and a band of a part that carries the second digital signal in each of the left band 1 and the right band 2 may be an intermediate-frequency band. For example, the second digital signal may be represented as $\sin(\omega t+\Phi)*x(t)$, where ω represents an angular frequency, t represents time, Φ represents a phase, and x(t) represents the information about the receiving slot corresponding to the first receiving end. For another example, as shown in FIG. 9, when the carrier in S101 is a plurality of subcarriers, spectrums of the plurality of subcarriers include a left band 1 and a right band 2 that are symmetric, the left band 1 does not carry a second digital signal, the right band 2 carries a second digital signal, and a band of a part that carries the second digital signal in the right band 2 may be an intermediate-frequency band. For example, the second digital signal may be represented as $e^{j\omega t}*x(t)$, where e represents a natural constant, j represents an imaginary unit, ω represents an angular frequency, t represents time, and x(t) represents the information about the receiving slot corresponding to the first receiving end. It should be noted that FIG. 7, FIG. 8, and FIG. 9 are all spectrum diagrams of a carrier. A horizontal axis represents a frequency, and a vertical axis represents an amplitude.

S102: The first receiving end obtains the first digital signal and the second digital signal carried on the carrier.

Figure 10:
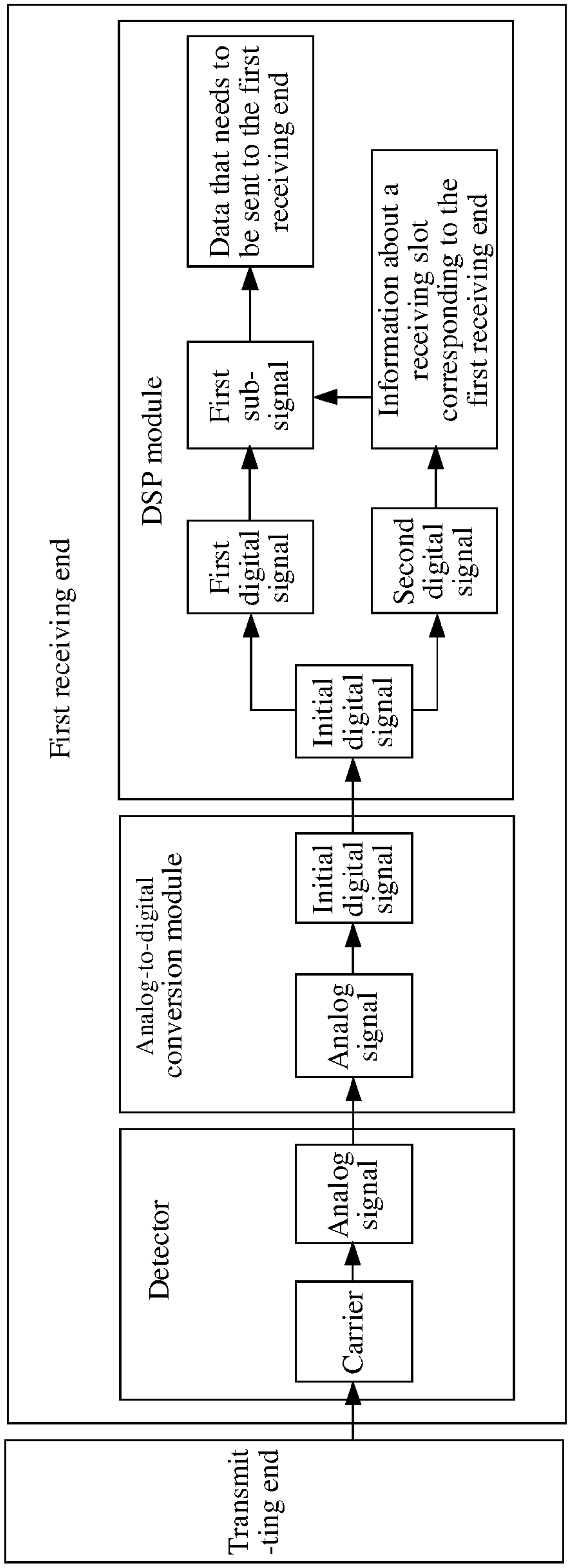
FIG. 10 is a schematic diagram of signal processing at a first receiving end according to an embodiment of this application.

Refer to FIG. 10. In S102, after receiving the carrier, the first receiving end may convert the carrier into an analog signal, and then convert the analog signal into an initial digital signal. Then, the first receiving end may split the initial digital signal to obtain the first digital signal and the second digital signal. A detector in the first receiving end may convert the carrier into the analog signal. An analog-to-digital conversion module in the first receiving end may convert the analog signal into the initial digital signal. A DSP module in the first receiving end may split the initial digital signal to obtain the first digital signal and the second digital signal. Optionally, before converting the analog signal into the initial digital signal, the first receiving end may further amplify the analog signal (not shown in FIG. 10). This process may be performed by a signal amplification module in the first receiving end.

After obtaining the initial digital signal, the first receiving end may split the initial digital signal into the first digital signal and the second digital signal based on a manner in which the transmitting end combines the first digital signal and the second digital signal. For example, a combination manner of the first digital signal and the second digital signal determines a location of the second digital signal in the initial digital signal. The first receiving end may determine the second digital signal in the initial digital signal based on the location, and determine the first digital signal other than the second digital signal.

In S102, after obtaining the first digital signal and the second digital signal, the first receiving end may further perform time recovery (TR) (or sequentially perform down-sampling and time recovery) on the two digital signals. For each digital signal in the first digital signal and the second digital signal, the first receiving end may perform time recovery on each digital signal by using the first digital signal, the second digital signal, or the foregoing initial digital signal. It should be noted that the first digital signal and the second digital signal are carried on a same carrier, and channel impact on the two digital signals is basically the same as channel impact on the initial digital signal. Therefore, time recovery can be performed by using the initial digital signal, the first digital signal, or the second digital signal.

In this embodiment of this application, an example in which the first receiving end performs time recovery on the two digital signals after obtaining the first digital signal and the second digital signal is used. Optionally, after obtaining the initial digital signal, the first receiving end may first perform time recovery on the initial digital signal, and then split the initial digital signal into the first digital signal and the second digital signal. In this case, after obtaining the first digital signal and the second digital signal, the first receiving end does not need to perform time recovery on the first digital signal and the second digital signal. When performing time recovery on the initial digital signal, the first receiving end may perform time recovery by using the initial digital signal, or may perform time recovery by using some digital signals (for example, the first digital signal or the second digital signal) in the initial digital signal. This is not limited in this embodiment of this application.

S103: The first receiving end determines the receiving slot corresponding to the first receiving end based on the information that is carried in the second digital signal and that is about the receiving slot corresponding to the first receiving end.

After S102, the first receiving end may parse the second digital signal to obtain information carried in the second digital signal. Then, the first receiving end may determine, in the information, the information about the receiving slot corresponding to the first receiving end, and determine the receiving slot based on the information. For example, when the information about the receiving slot corresponding to the first receiving end includes the identifier of the first receiving end, the first receiving end may determine, based on the identifier of the first receiving end, the information about the receiving slot corresponding to the first receiving end in the information carried in the second digital signal.

For example, the information about the receiving slot corresponding to the first receiving end includes the first information of the receiving slot corresponding to the first receiving end. In one aspect, if the first information includes a start time point and a length of a slot, the first receiving end may determine that a time period that starts from the start time point of the slot and lasts for the length is the receiving slot corresponding to the first receiving end. In this case, a start time point of the receiving slot is the start time point in the first information, and a length of the receiving slot is the length in the first information. In another aspect, if the first information includes a start time point and an end time point of a slot, the first receiving end may determine a time period from the start time point to the end time point as the receiving slot corresponding to the first receiving end. In this case, a start time point of the receiving slot is the start time point in the first information, and an end time point of the receiving slot is the end time point in the first information.

For another example, the information about the receiving slot corresponding to the first receiving end includes the first information of the receiving slot corresponding to the first receiving end, and the information about the time deviation of the first receiving end relative to the transmitting end. In this case, after determining an initial slot based on base time, the first receiving end may correct the initial slot based on the information about the time deviation, to obtain the receiving slot corresponding to the first receiving end. When the first information includes a start time point and a length of a slot, a start time point of the initial slot is the start time point in the first information, and a length of the initial slot is the length in the first information. When the first information includes a start time point and an end time point of a slot, a start time point of the initial slot is the start time point in the first information, and an end time point of the initial slot is the end time point in the first information.

The information about the time deviation of the first receiving end relative to the transmitting end may include: the time deviation of the first receiving end relative to the transmitting end, or time count information of the transmitting end. When the information about the time deviation of the first receiving end relative to the transmitting end includes the time deviation, after determining the initial slot based on the first information, the first receiving end may correct the initial slot based on the time deviation, to obtain the receiving slot corresponding to the first receiving end. When the information about the time deviation of the first receiving end relative to the transmitting end includes the time count information of the transmitting end, after determining the initial slot based on the first information, the first receiving end may determine the time deviation based on the time count information, and then correct the initial slot based on the time deviation, to obtain the receiving slot corresponding to the first receiving end. When the information about the receiving slot corresponding to the first receiving end includes the information about the time deviation, the first receiving end can correct the initial slot based on the information, to obtain an accurate receiving slot corresponding to the first receiving end.

S104: The first receiving end performs digital signal processing on a first sub-signal in the first digital signal, where the first sub-signal is determined based on the receiving slot corresponding to the first receiving end.

The first digital signal includes a plurality of sub-signals that one-to-one correspond to the plurality of receiving ends, and a sub-signal corresponding to each receiving end is a signal sent to the receiving end. A sub-signal corresponding to each receiving end is carried in a receiving slot corresponding to the receiving end, and the sub-signal can be determined based on the receiving slot. The first sub-signal is a sub-signal corresponding to the first receiving end in the plurality of sub-signals, and the first sub-signal is carried in the receiving slot corresponding to the first receiving end.

The second digital signal indicates the first receiving end to perform digital signal processing on the first sub-signal in the first digital signal. After determining the receiving slot corresponding to the first receiving end, the first receiving end may determine that a signal that is in the first digital signal and that is carried in the receiving slot is the first sub-signal, and perform digital signal processing on the first sub-signal, to obtain data that needs to be sent by the transmitting end to the first receiving end.

The digital signal processing in S104 may be one or more types of processing. For example, the digital signal processing herein may include at least one of synchronization (sync) processing, nonlinear compensation control (NLC) processing, equalization processing, fast Fourier transform (FFT) processing, and forward error correction (FEC) processing.

A sequence of various processing in the digital signal processing is not limited in this embodiment of this application. For example, the digital signal processing in S104 includes sequentially performing synchronization (sync) processing, NLC processing, FFT processing, and FEC processing.

S105: The first receiving end prohibits digital signal processing on a sub-signal other than the first sub-signal in the first digital signal.

After determining the first sub-signal in the first digital signal, the first receiving end prohibits digital signal processing on a sub-signal other than the first sub-signal in the first digital signal, so that the first receiving end does not obtain data sent by the transmitting end to another receiving end, to ensure security of communication between the transmitting end and the another receiving end. In addition, because the first receiving end does not need to perform digital signal processing on another sub-signal, power consumption of the first receiving end is reduced.

Figure 11:
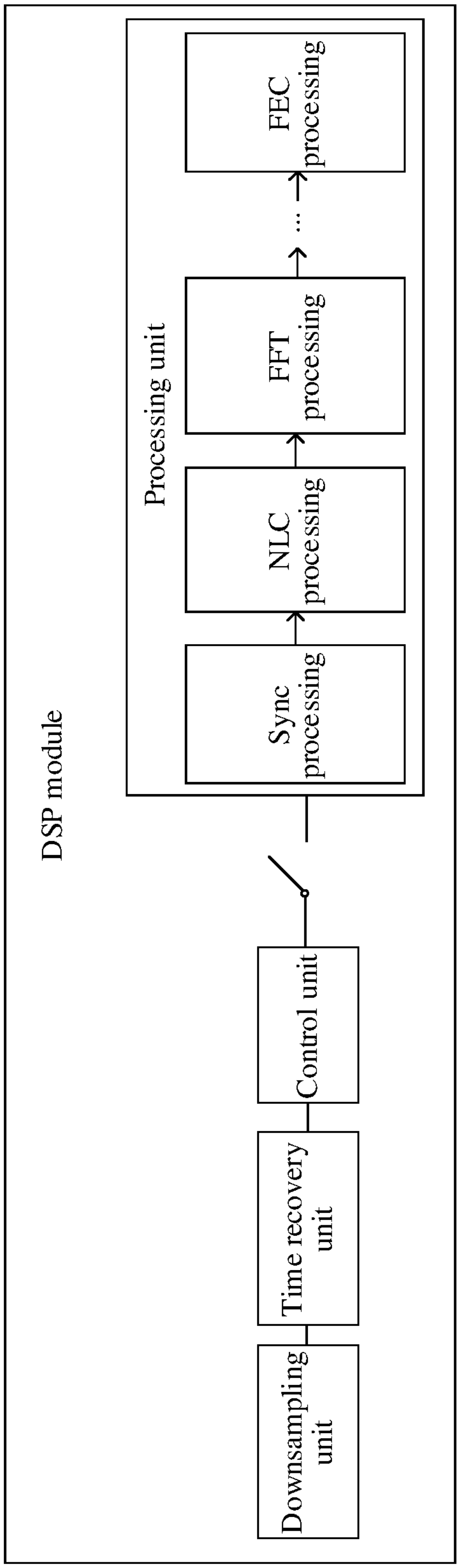
FIG. 11 is a schematic diagram of a DSP module according to an embodiment of this application.

For example, the first receiving end may perform S103, S104, and S105 by using the DSP module. As shown in FIG. 11, the DSP module may include a control unit, a switch, and a processing unit that are sequentially connected, and the processing unit is configured to perform the foregoing digital signal processing. In FIG. 11, an example in which the digital signal processing in S104 includes sequentially performing sync processing, NLC processing, FFT processing, and FEC processing is used. In addition, other processing may further exist between the FFT processing and the FEC processing. After obtaining the first digital signal and the second digital signal, the control unit may transmit the first digital signal to the switch. The control unit may further determine the receiving slot corresponding to the first receiving end based on the second digital signal, send a closing signal to the switch in the receiving slot, and send an opening signal to the switch outside the receiving slot. The closing signal indicates the switch to close, so that the switch transmits the input first digital signal to the processing unit for digital signal processing. The opening signal indicates the switch to open, so that the first digital signal input to the switch cannot be transmitted to the processing unit for digital signal processing. In this way, the first receiving end processes the digital signal of the first sub-signal in S104, and prohibits digital signal processing on another sub-signal in S105.

Figure 12:
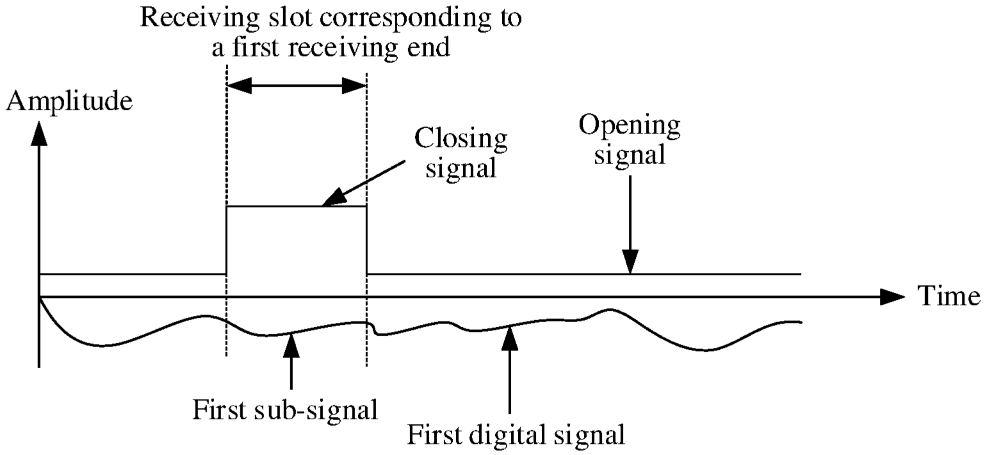
FIG. 12 is a schematic diagram of a signal according to an embodiment of this application.

For example, it is assumed that the first digital signal is shown in FIG. 12. A horizontal axis in FIG. 12 represents time, and a vertical axis represents an amplitude of the first digital signal. In a receiving slot (the receiving slot corresponding to the first receiving end) in which the first sub-signal in the first digital signal is carried, the control unit may generate a closing signal; and outside the receiving slot, the control unit may generate an opening signal.

Optionally, still refer to FIG. 11. The DSP module may further include a downsampling unit and a time recovery unit that are sequentially connected. The downsampling unit is configured to separately perform downsampling on the first digital signal and the second digital signal obtained in S102. The time recovery unit is configured to separately perform time recovery on the downsampled first digital signal and the downsampled second digital signal. The time recovery unit is connected to the control unit, and both the first digital signal and the second digital signal processed by the time recovery unit are input to the control unit.

It should be noted that, in the foregoing embodiment, an example in which the first digital signal and the second digital signal are carried on a same carrier is used. Optionally, the first digital signal and the second digital signal may also be carried on different carriers. In this case, a carrier that carries the second digital signal may be transmitted before a carrier that carries the first digital signal.

In addition, in a running process of the communication system, the transmitting end needs to send a carrier to a receiving end for a plurality of times, to communicate with the receiving end for a plurality of times. All these carriers may carry the first digital signal and the second digital signal. Alternatively, all these carriers may carry the first digital signal, some carriers carry the second digital signal, and some carriers do not carry the second digital signal. After receiving the carrier carrying the second digital signal each time, the first receiving end may determine the receiving slot corresponding to the first receiving end based on the second digital signal, and update the receiving slot. Each time the first receiving end determines the first sub-signal in the first digital signal, the first receiving end may determine the first sub-signal based on a newly determined receiving slot corresponding to the first receiving end.

For example, if a carrier received by the first receiving end at a time carries a second digital signal, the first receiving end may determine a receiving slot corresponding to the first receiving end based on the second digital signal, and determine a first sub-signal in a first digital signal carried on the carrier. If a carrier received by the first receiving end at a time does not carry a second digital signal, the first receiving end may determine, based on a receiving slot that corresponds to the first receiving end and that is determined by using a second digital signal sent by the transmitting end last time, a first sub-signal in a first digital signal carried on the carrier.

It should be noted that, when the carrier carries the second digital signal, the second digital signal may be located in a preset location in the initial digital signal, and the first receiving end may obtain the second digital signal based on the preset location. When the carrier does not carry the second digital signal, a signal at the preset location may be empty.

In the foregoing embodiment, an example in which the first receiving end determines the receiving slot corresponding to the first receiving end based on the second digital signal sent by the transmitting end is used. When the first receiving end determines the receiving slot corresponding to the first receiving end based on the second digital signal sent by the transmitting end, a receiving slot corresponding to each receiving end is determined by the transmitting end. In this case, the transmitting end may flexibly set a corresponding receiving slot for each receiving end according to a requirement. Optionally, the first receiving end may not determine the receiving slot based on the second digital signal, and correspondingly, the transmitting end does not need to send the second digital signal to the first receiving end. For example, the receiving slot corresponding to the first receiving end is configured on both the transmitting end and the first receiving end. The transmitting end may use the receiving slot to carry a digital signal that needs to be sent to the first receiving end. The first receiving end may determine the first sub-signal in the first digital signal based on the receiving slot, and perform digital signal processing on the first sub-signal.

Figure 13:
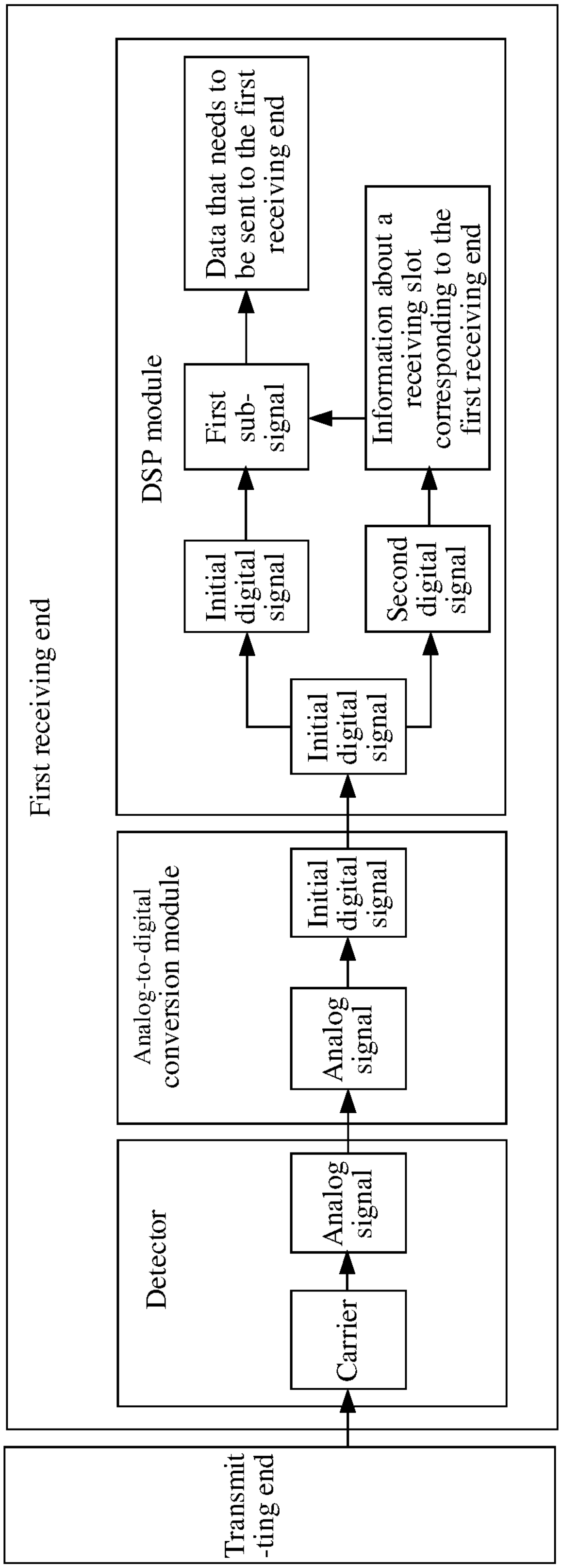
FIG. 13 is another schematic diagram of signal processing at a first receiving end according to an embodiment of this application.

In this embodiment of this application, an example in which the first receiving end splits the initial digital signal into the first digital signal and the second digital signal after obtaining the initial digital signal in S102 is used. Optionally, as shown in FIG. 13, the first receiving end may extract the second digital signal from the initial digital signal after obtaining the initial digital signal in S102. In this case, in S104, the first receiving end may determine the first sub-signal in the initial digital signal based on the receiving slot that corresponds to the first receiving end and that is determined based on the second digital signal, and perform digital signal processing on the first sub-signal.

The foregoing describes in detail the communication method provided in this application with reference to FIG. 1 to FIG. 12. It may be understood that, to implement the functions described in the foregoing method, a communication apparatus needs to include corresponding hardware and/or software modules for performing the functions. This application can be implemented in a form of hardware or a combination of hardware and computer software with reference to the execution processes of the methods described in embodiments disclosed in this specification. Whether a function is performed by hardware or hardware driven by computer software depends on particular applications and design constraints of the technical solutions. A person skilled in the art may use different manners to implement the described functions for each particular application with reference to the embodiments, but it should not be considered that this implementation goes beyond the scope of this application.

In this embodiment, a corresponding communication apparatus may be divided into functional modules according to the foregoing method embodiment. For example, each functional module may be obtained through division based on each corresponding function, or two or more functions may be integrated into one processing module. The integrated module may be implemented in a form of hardware.

Figure 14:
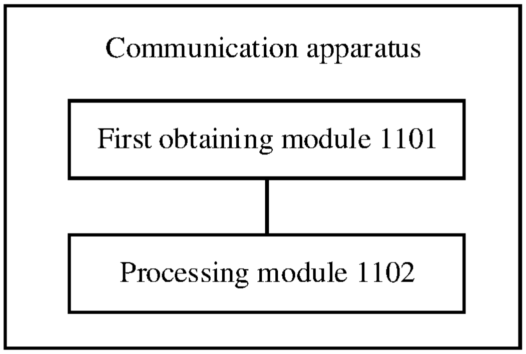
FIG. 14 is a block diagram of a communication apparatus according to an embodiment of this application.
Figure 15:
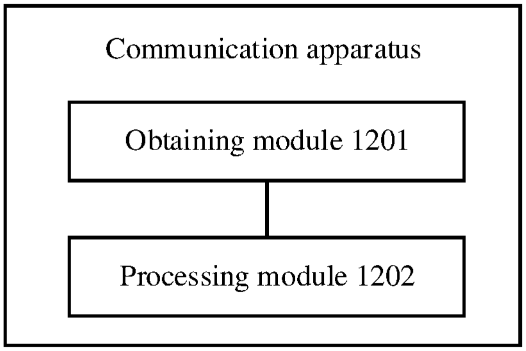
FIG. 15 is a block diagram of another communication apparatus according to an embodiment of this application.

When a manner of division into the functional modules is used, the following describes a communication apparatus provided in this application with reference to FIG. 14 and FIG. 15.

FIG. 14 is a block diagram of a communication apparatus according to an embodiment of this application. The communication apparatus may be, for example, the first receiving end in the foregoing embodiment. As shown in FIG. 14, the communication apparatus includes a first obtaining module 1101 and a processing module 1102.

The first obtaining module 1101 is configured to obtain a first digital signal sent by a transmitting end. For an operation performed by the first obtaining module 1101, refer to content related to the first receiving end in S102 in the foregoing embodiment.

The processing module 1102 is configured to perform digital signal processing on a first sub-signal in the first digital signal. The first sub-signal is determined based on a receiving slot corresponding to the first receiving end, and different receiving ends in a plurality of receiving ends correspond to different receiving slots. For an operation performed by the processing module 1102, refer to content related to the first receiving end in S104 in the foregoing embodiment.

Optionally, both the first obtaining module 1101 and the processing module 1102 may be implemented in a DSP module in the first receiving end. For example, the DSP module shown in FIG. 11 may further include an obtaining unit (not shown in FIG. 11), the obtaining unit is connected to a downsampling unit, and the first obtaining module 1101 may be implemented by the obtaining unit. The processing module 1102 may be implemented by the processing unit in FIG. 11.

The processing module in the first receiving end needs to perform digital signal processing only on the first sub-signal that is in the first digital signal and that is determined based on the receiving slot corresponding to the first receiving end, so that the first receiving end needs to process a small quantity of digital signals, to reduce power consumption of the first receiving end. In addition, after processing the first sub-signal, the processing module does not obtain data sent by the transmitting end to another receiving end, to ensure security of communication between the transmitting end and the another receiving end.

Optionally, the communication apparatus further includes: a prohibition module (not shown in FIG. 14), configured to prohibit digital signal processing on a sub-signal other than the first sub-signal in the first digital signal. For an operation performed by the prohibition module, refer to content related to the first receiving end in S105 in the foregoing embodiment. Because the prohibition module prohibits digital signal processing on another sub-signal, the first receiving end needs to process a small quantity of digital signals, to reduce power consumption of the first receiving end. In addition, the first receiving end does not obtain data sent by the transmitting end to another receiving end, to ensure security of communication between the transmitting end and the another receiving end. Optionally, the prohibition module may be implemented in the DSP module in the first receiving end, for example, by using a switch in the DSP module shown in FIG. 11.

Optionally, the first receiving end may determine the receiving slot corresponding to the first receiving end based on a second digital signal sent by the transmitting end. In this case, the communication apparatus further includes a second obtaining module and a determining module (not shown in FIG. 14).

The second obtaining module is configured to obtain the second digital signal sent by the transmitting end. The second digital signal carries information about the receiving slot corresponding to the first receiving end. For an operation performed by the second obtaining module, refer to content related to the first receiving end in S102 in the foregoing embodiment.

The determining module is configured to determine the receiving slot corresponding to the first receiving end based on the information that is carried in the second digital signal and that is about the receiving slot corresponding to the first receiving end. For an operation performed by the determining module, refer to content related to the first receiving end in S103 in the foregoing embodiment.

Optionally, both the second obtaining module and the determining module may be implemented in the DSP module in the first receiving end. For example, the DSP module shown in FIG. 11 may further include an obtaining unit (not shown in FIG. 11), the obtaining unit is connected to a downsampling unit, and the second obtaining module may be implemented by the obtaining unit. The determining module may be implemented by a control unit in FIG. 11.

When the first receiving end determines the receiving slot corresponding to the first receiving end based on the second digital signal sent by the transmitting end, a receiving slot corresponding to each receiving end is determined by the transmitting end. In this case, the transmitting end may flexibly set a corresponding receiving slot for each receiving end according to a requirement. Certainly, the first receiving end may also determine the receiving slot corresponding to the first receiving end in another manner. For example, the receiving slot is preconfigured on the transmitting end and the first receiving end.

The first digital signal and the second digital signal may be carried on a same carrier, or may be carried on different carriers. When the first digital signal and the second digital signal are carried on a same carrier, the communication apparatus further includes a receiving module (not shown in FIG. 14). The receiving module is configured to receive a carrier sent by the transmitting end. The carrier carries the first digital signal and the second digital signal. For an operation performed by the receiving module, refer to content related to the first receiving end in S101 in the foregoing embodiment. If the second obtaining module is implemented in the DSP module in the first receiving end, the DSP module may receive the carrier by using an optical receiver in the first receiving end.

In this case, the first obtaining module is configured to obtain the first digital signal carried on the carrier, and the second obtaining module is configured to obtain the second digital signal carried on the carrier. When the first digital signal and the second digital signal are carried on a same carrier, the transmitting end may simultaneously send the first digital signal and the second digital signal to the first receiving end by using the same carrier, to improve communication efficiency. In addition, when the first digital signal and the second digital signal are carried on different carriers, a carrier that carries the second digital signal may be transmitted before carriers that carry digital signals carried in the plurality of receiving slots.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. Further, to help the first receiving end identify the slot frame, the frame header of the slot frame may include a type identifier of the slot frame, and the type identifier of the slot frame is different from a type identifier of another frame.

Optionally, the information about the receiving slot corresponding to the first receiving end includes first information of the receiving slot corresponding to the first receiving end, and the first information includes a start time point and a length of a slot, or a start time point and an end time point of a slot. In one aspect, if the first information includes a start time point and a length of a slot, the first receiving end may determine that a time period that starts from the start time point of the slot and lasts for the length is the receiving slot corresponding to the first receiving end. In this case, a start time point of the receiving slot is the start time point in the first information, and a length of the receiving slot is the length in the first information. In another aspect, if the first information includes a start time point and an end time point of a slot, the first receiving end may determine a time period from the start time point to the end time point as the receiving slot corresponding to the first receiving end. In this case, a start time point of the receiving slot is the start time point in the first information, and an end time point of the receiving slot is the end time point in the first information.

Optionally, the information about the receiving slot corresponding to the first receiving end may further include an identifier of the first receiving end. In this case, the first receiving end may determine, based on the identifier of the first receiving end, the information about the receiving slot corresponding to the first receiving end in information carried in the second digital signal.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. In this case, the information about the receiving slot corresponding to the first receiving end includes the first information of the receiving slot corresponding to the first receiving end, and the information about the time deviation of the first receiving end relative to the transmitting end. The first information includes a start time point and a length of a slot, or a start time point and an end time point of a slot.

When determining the receiving slot corresponding to the first receiving end based on the information that is carried in the second digital signal and that is about the receiving slot corresponding to the first receiving end, the determining module may first determine an initial slot based on the first information, and then correct the initial slot based on the information about the time deviation, to obtain the receiving slot corresponding to the first receiving end. When the first information includes a start time point and a length of a slot, a start time point of the initial slot is the start time point in the first information, and a length of the initial slot is the length in the first information. When the first information includes a start time point and an end time point of a slot, a start time point of the initial slot is the start time point in the first information, and an end time point of the initial slot is the end time point in the first information. When the information about the receiving slot corresponding to the first receiving end includes the information about the time deviation, the first receiving end can correct the initial slot based on the information, to obtain an accurate receiving slot corresponding to the first receiving end.

Optionally, after obtaining the first digital signal and the second digital signal, the first receiving end may further perform time recovery on the two digital signals. Correspondingly, the communication apparatus further includes a time recovery module (not shown in FIG. 14). If the first digital signal and the second digital signal are carried on a same carrier, for each digital signal in the first digital signal and the second digital signal, the time recovery module may perform time recovery on each digital signal by using the first digital signal, the second digital signal, or the foregoing initial digital signal. For an operation performed by the time recovery module, refer to content related to time recovery in the foregoing embodiment. It should be noted that the first digital signal and the second digital signal are carried on a same carrier, and channel impact on the two digital signals is basically the same as channel impact on the initial digital signal. Therefore, time recovery can be performed by using the initial digital signal, the first digital signal, or the second digital signal.

The time recovery module may be implemented in the DSP module in the first receiving end. For example, the time recovery module may be implemented by using a time recovery unit in FIG. 11.

FIG. 15 is a block diagram of another communication apparatus according to an embodiment of this application. The communication apparatus may be, for example, the transmitting end in the foregoing embodiment. The communication apparatus includes an obtaining module 1201 and a sending module 1202.

The obtaining module 1201 is configured to obtain information about a receiving slot corresponding to a first receiving end. The first receiving end is any one of a plurality of receiving ends.

The sending module 1202 is configured to send a first digital signal and a second digital signal to the first receiving end. The second digital signal carries the information about the receiving slot corresponding to the first receiving end, the second digital signal indicates the first receiving end to perform digital signal processing on a first sub-signal in the first digital signal, the first sub-signal is carried in the receiving slot corresponding to the first receiving end, and the plurality of receiving ends correspond to different receiving slots.

For operations performed by the obtaining module 1201 and the sending module 1202, refer to content related to the transmitting end in S101 in the foregoing embodiment. The obtaining module 1201 may be implemented in a DSP module in the transmitting end. The sending module 1202 may be implemented by using an electrical transmitter and an optical transmitter in the transmitting end.

Optionally, the first digital signal and the second digital signal may be carried on a same carrier, or may be carried on different carriers. When the first digital signal and the second digital signal are carried on a same carrier, the sending module 1202 is configured to send a carrier to the first receiving end. The carrier carries the first digital signal and the second digital signal. When the sending module 1202 sends the first digital signal and the second digital signal in a manner of sending the carrier to the first receiving end, if the sending module 1202 is implemented in the DSP module in the transmitting end, the DSP module may send the carrier by using a digital-to-analog conversion module, a signal amplification module, and the optical transmitter in the transmitting end.

Optionally, the second digital signal may be implemented by using a frame. In this case, the second digital signal includes a slot frame, and the slot frame includes a frame header and a load. The load of the slot frame includes the information about the receiving slot corresponding to the first receiving end, so that the second digital signal carries the information. Further, to help the first receiving end identify the slot frame, the frame header of the slot frame may include a type identifier of the slot frame, and the type identifier of the slot frame is different from a type identifier of another frame.

Optionally, the information about the receiving slot corresponding to the first receiving end includes first information of the receiving slot corresponding to the first receiving end, and the first information includes a start time point and a length of a slot, or a start time point and an end time point of a slot. In one aspect, if the first information includes a start time point and a length of a slot, the receiving slot corresponding to the first receiving end is a time period that starts from the start time point of the slot and lasts for the length. In this case, a start time point of the receiving slot is the start time point in the first information, and a length of the receiving slot is the length in the first information. In another aspect, if the first information includes a start time point and an end time point of a slot, the receiving slot corresponding to the first receiving end is a time period from the start time point to the end time point. In this case, a start time point of the receiving slot is the start time point in the first information, and an end time point of the receiving slot is the end time point in the first information.

Optionally, the information about the receiving slot corresponding to the first receiving end may further include an identifier of the first receiving end. In this case, the first receiving end may determine, based on the identifier of the first receiving end, the information about the receiving slot corresponding to the first receiving end in information carried in the second digital signal.

Considering that a time deviation may exist between the first receiving end and the transmitting end, the information about the receiving slot corresponding to the first receiving end may further include information about the time deviation of the first receiving end relative to the transmitting end. The information may indicate the time deviation. For example, the information includes the time deviation of the first receiving end relative to the transmitting end, or time count information of the transmitting end. In this case, the information about the receiving slot corresponding to the first receiving end includes the first information of the receiving slot corresponding to the first receiving end, and the information about the time deviation of the first receiving end relative to the transmitting end. The first information includes a start time point and a length of a slot, or a start time point and an end time point of a slot.

When an integrated unit is used, the communication apparatus that is provided by the transmitting end or the first receiving end in this application may include a chip. The chip includes a programmable logic circuit and/or program instructions. When running, the chip is configured to implement any communication method performed by the transmitting end according to embodiments of this application, or when running, the chip is configured to implement any communication method performed by the first receiving end according to embodiments of this application.

An embodiment of this application further provides a communication system. The communication system includes a transmitting end and a plurality of receiving ends. The transmitting end includes any communication apparatus (the communication apparatus shown in FIG. 15) used for the transmitting end according to embodiments of this application. The receiving end includes any communication apparatus (the communication apparatus shown in FIG. 14) used for a first receiving end according to embodiments of this application.

An embodiment of this application further provides a chip. The chip includes a programmable logic circuit and/or program instructions. When running, the chip is configured to implement any communication method performed by a transmitting end according to embodiments of this application, or when running, the chip is configured to implement any communication method performed by a first receiving end according to embodiments of this application.

Optionally, when the chip runs and is configured to implement any communication method performed by the transmitting end according to embodiments of this application, the chip may be used for a DSP module in the transmitting end, and the chip may be referred to as a DSP chip. When the chip runs and is configured to implement any communication method performed by the first receiving end according to embodiments of this application, the chip may be used for a DSP module in the first receiving end, and the chip may be referred to as a DSP chip.

In this application, the terms "first", "second", and the like are merely intended for description, but cannot be understood as an indication or implication of relative importance. The term "at least one" means one or more, and the term "a plurality of" means two or more, unless expressly limited otherwise. The term "and/or" describes only an association relationship for describing associated objects and represents that three relationships may exist. For example, A and/or B may represent the following three cases: Only A exists, both A and B exist, and only B exists.

Different types of embodiments such as the method embodiments and the apparatus embodiments provided in embodiments of this application may be cross-referenced. This is not limited in embodiments of this application. A sequence of the operations of the method embodiments provided in embodiments of this application can be properly adjusted, and the operations can be correspondingly added or deleted based on a situation. Any method that can be easily figured out by a person skilled in the art within the technical scope disclosed in this application shall fall within the protection scope of this application. Therefore, details are not described again.

In the corresponding embodiments provided in this application, it should be understood that the disclosed system, apparatus, and the like may be implemented in other composition manners. For example, the described apparatus embodiment is merely an example. For example, division into the modules is merely logical function division and may be other division during actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The units described as separate parts may or may not be physically separate, and parts described as units may or may not be physical units, may be located in one position, or may be distributed on a plurality of apparatuses. Some or all of the units may be selected based on actual requirements to achieve the objectives of the solutions of embodiments.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a first receiving end in a communication system, the communication system comprising a transmitting end and a plurality of receiving ends including the first receiving end, the transmitting end being communicatively connected to all the plurality of receiving ends, and the method comprising:

obtaining a first digital signal sent by the transmitting end;

performing digital signal processing on a first sub-signal in the first digital signal, wherein the first sub-signal is determined based on a receiving slot corresponding to the first receiving end, and different receiving ends in the plurality of receiving ends correspond to different receiving slots; and prohibiting the digital signal processing by the first receiving end on a sub-signal other than the first sub-signal in the first digital signal.

2. The method according to claim 1, further comprising:

before performing the digital signal processing on the first sub-signal in the first digital signal, obtaining a second digital signal sent by the transmitting end, wherein the second digital signal carries information about the receiving slot corresponding to the first receiving end; and determining the receiving slot corresponding to the first receiving end based on the information that is carried in the second digital signal and that is about the receiving slot corresponding to the first receiving end.

3. The method according to claim 2, further comprising:

receiving a carrier sent by the transmitting end, wherein the carrier carries the first digital signal and the second digital signal;

wherein obtaining the first digital signal sent by the transmitting end comprises:

obtaining the first digital signal carried on the carrier; and wherein obtaining the second digital signal sent by the transmitting end comprises:

obtaining the second digital signal carried on the carrier.

4. The method according to claim 2, wherein the second digital signal comprises a slot frame, and a load of the slot frame comprises the information about the receiving slot corresponding to the first receiving end.

5. The method according to claim 4, wherein a frame header of the slot frame comprises a type identifier of the slot frame.

6. The method according to claim 2, wherein the information about the receiving slot corresponding to the first receiving end comprises:

first information of the receiving slot corresponding to the first receiving end, wherein the first information comprises:

a start time point and a length of a slot, or a start time point and an end time point of a slot.

7. The method according to claim 6, wherein the information about the receiving slot corresponding to the first receiving end further comprises:

an identifier of the first receiving end.

8. The method according to claim 6, wherein the information about the receiving slot corresponding to the first receiving end further comprises:

information about a time deviation of the first receiving end relative to the transmitting end; and wherein determining the receiving slot corresponding to the first receiving end based on the information that is carried in the second digital signal and that is about the receiving slot corresponding to the first receiving end comprises:

determining an initial slot based on the first information; and correcting the initial slot based on the information about the time deviation, to obtain the receiving slot corresponding to the first receiving end, wherein:

when the first information comprises a start time point and a length of a slot, a start time point of the initial slot is the start time point in the first information, and a length of the initial slot is the length in the first information; or when the first information comprises a start time point and an end time point of a slot, the start time point of the initial slot is the start time point in the first information, and an end time point of the initial slot is the end time point in the first information.

9. The method according to claim 3, further comprising:

before performing the digital signal processing on the first sub-signal in the first digital signal, separately performing time recovery on the first digital signal and the second digital signal by using the second digital signal.

10. A communication apparatus, wherein the communication apparatus is a first receiving end in a communication system, the communication system comprises a transmitting end and a plurality of receiving ends including the first receiving end, the transmitting end is communicatively connected to the plurality of receiving ends, and the communication apparatus comprises:

a receiver, configured to obtain a first digital signal sent by the transmitting end;

a processor, configured to perform digital signal processing on a first sub-signal in the first digital signal, wherein the first sub-signal is determined based on a receiving slot corresponding to the first receiving end, and different receiving ends in the plurality of receiving ends correspond to different receiving slots; and prohibit the digital signal processing by the communication apparatus on a sub-signal other than the first sub-signal in the first digital signal.

11. The communication apparatus according to claim 10, wherein the receiver is further configured to obtain a second digital signal sent by the transmitting end, wherein the second digital signal carries information about the receiving slot corresponding to the first receiving end; and wherein the processor is configured to determine the receiving slot corresponding to the first receiving end based on the information that is carried in the second digital signal and that is about the receiving slot corresponding to the first receiving end.

12. The communication apparatus according to claim 11, wherein the receiver is configured to:

receive a carrier sent by the transmitting end, wherein the carrier carries the first digital signal and the second digital signal, obtain the first digital signal carried on the carrier; and obtain the second digital signal carried on the carrier.

13. The communication apparatus according to claim 11, wherein the second digital signal comprises a slot frame, and a load of the slot frame comprises the information about the receiving slot corresponding to the first receiving end.

14. The communication apparatus according to claim 13, wherein a frame header of the slot frame comprises a type identifier of the slot frame.

15. The communication apparatus according to claim 11, wherein the information about the receiving slot corresponding to the first receiving end comprises:

first information of the receiving slot corresponding to the first receiving end, wherein the first information comprises:

a start time point and a length of a slot, or a start time point and an end time point of a slot.

16. The communication apparatus according to claim 15, wherein the information about the receiving slot corresponding to the first receiving end further comprises:

an identifier of the first receiving end.

17. The communication apparatus according to claim 15, wherein the information about the receiving slot corresponding to the first receiving end further comprises:

information about a time deviation of the first receiving end relative to the transmitting end; and wherein the processor is configured to:

determine an initial slot based on the first information; and correct the initial slot based on the information about the time deviation, to obtain the receiving slot corresponding to the first receiving end, wherein:

when the first information comprises a start time point and a length of a slot, a start time point of the initial slot is the start time point in the first information, and a length of the initial slot is the length in the first information; or when the first information comprises a start time point and an end time point of a slot, the start time point of the initial slot is the start time point in the first information, and an end time point of the initial slot is the end time point in the first information.

18. The communication apparatus according to claim 12, wherein the processor is configured to separately perform time recovery on the first digital signal and the second digital signal by using the second digital signal.

19. A chip, comprising a programmable logic circuit, the programmable logic circuit being configured to cause a first receiving end to:

obtain a first digital signal sent by a transmitting end, wherein a communication system comprises the transmitting end and a plurality of receiving ends including the first receiving end;

perform digital signal processing on a first sub-signal in the first digital signal, wherein the first sub-signal is determined based on a receiving slot corresponding to the first receiving end, and different receiving ends in the plurality of receiving ends correspond to different receiving slots; and prohibit the digital signal processing by the first receiving end on a sub-signal other than the first sub-signal in the first digital signal.

20. The chip according to claim 19, wherein the programmable logic circuit is further configured to cause the first receiving end to:

before performing the digital signal processing on the first sub-signal in the first digital signal, obtain a second digital signal sent by the transmitting end, wherein the second digital signal carries information about the receiving slot corresponding to the first receiving end; and determine the receiving slot corresponding to the first receiving end based on the information that is carried in the second digital signal and that is about the receiving slot corresponding to the first receiving end.

* * * * *